(12) United States Patent
Miller et al.

(10) Patent No.: US 8,800,727 B2
(45) Date of Patent: Aug. 12, 2014

(54) WET DISC BRAKE SYSTEM

(75) Inventors: Andrew Miller, City Beach (AU);
Robert McDougall, Woodvale (AU);
Stuart Millgate, Willetton (AU)

(73) Assignee: Advanced Braking Pty Ltd. (AU)

( * ) Notice: Subject to any disclaimer, the term of this patent is extended or adjusted under 35 U.S.C. 154(b) by 77 days.

(21) Appl. No.: 13/490,701

(22) Filed: Jun. 7, 2012

(65) Prior Publication Data
US 2012/0318622 A1    Dec. 20, 2012

Related U.S. Application Data

(63) Continuation of application No. PCT/AU2010/001653, filed on Dec. 8, 2010.

(30) Foreign Application Priority Data

Dec. 8, 2009  (AU) ............................... 2009905982

(51) Int. Cl.
*F16D 65/853*    (2006.01)
*F16D 65/00*    (2006.01)
*F16D 55/00*    (2006.01)

(52) U.S. Cl.
CPC .......... *F16D 65/0081* (2013.01); *F16D 65/853* (2013.01); *F16D 65/0075* (2013.01); *F16D 2055/002* (2013.01); *F16D 2055/0033* (2013.01)
USPC ................... 188/71.6; 188/264 D; 188/264 E

(58) Field of Classification Search
CPC .............. F16D 65/0075; F16D 65/853; F16D 65/0031; F16D 65/0081; F16D 2055/002; F16D 2055/0033; F16D 2055/0037
USPC ....... 188/71.6, 264 W, 264 E, 264 D, 264 CC
See application file for complete search history.

(56) References Cited

U.S. PATENT DOCUMENTS

| | | | | |
|---|---|---|---|---|
| 2,981,376 A | * | 4/1961 | Zeidler | 188/71.5 |
| 4,429,767 A | * | 2/1984 | Jenkins | 188/71.8 |
| 5,009,293 A | | 4/1991 | Takahashi | 188/72.4 |
| 5,228,543 A | | 7/1993 | Heidenreich | 188/72.4 |

(Continued)

FOREIGN PATENT DOCUMENTS

| | | | |
|---|---|---|---|
| FR | 2820794 A1 | * | 8/2002 |
| GB | 2013804 A | * | 8/1979 |

(Continued)

OTHER PUBLICATIONS

Australian Patent Office, International Search Report dated Mar. 8, 2011, PCT/AU2010/001653.

*Primary Examiner* — Anna Momper
(74) *Attorney, Agent, or Firm* — Sunstein Kann Murphy & Timbers LLP

(57) ABSTRACT

A wet disc brake system is described which includes a housing assembly and brake callipers. The housing assembly is provided with openings for seating cylinders of respective brake callipers. The callipers are coupled to a structural component of a vehicle to which the system is fitted and in particular a flange of an axle housing. This enables reactive forces created during a braking operation to be transmitted via the callipers to the flange and axle housing rather than being carried by housing assembly. As the housing assembly does not bear any substantive load, it may be made of a relatively light weight construction or material.

11 Claims, 19 Drawing Sheets

(56) References Cited

U.S. PATENT DOCUMENTS

| | | | |
|---|---|---|---|
| 6,488,132 B2 | 12/2002 | Matsuishi | 188/73.39 |
| 7,493,994 B2 * | 2/2009 | Plantan et al. | 188/153 D |
| 2006/0054426 A1 | 3/2006 | Fillmore | 188/71.4 |
| 2006/0231353 A1 | 10/2006 | Gilliland | 188/73.31 |

FOREIGN PATENT DOCUMENTS

| | | | |
|---|---|---|---|
| JP | 2000-018290 | 1/2000 | F16D 65/00 |
| JP | 2000018290 A * | 1/2000 | |
| WO | WO 93/07402 | 4/1993 | F16D 55/02 |
| WO | WO 2007072510 A1 * | 6/2007 | |

* cited by examiner

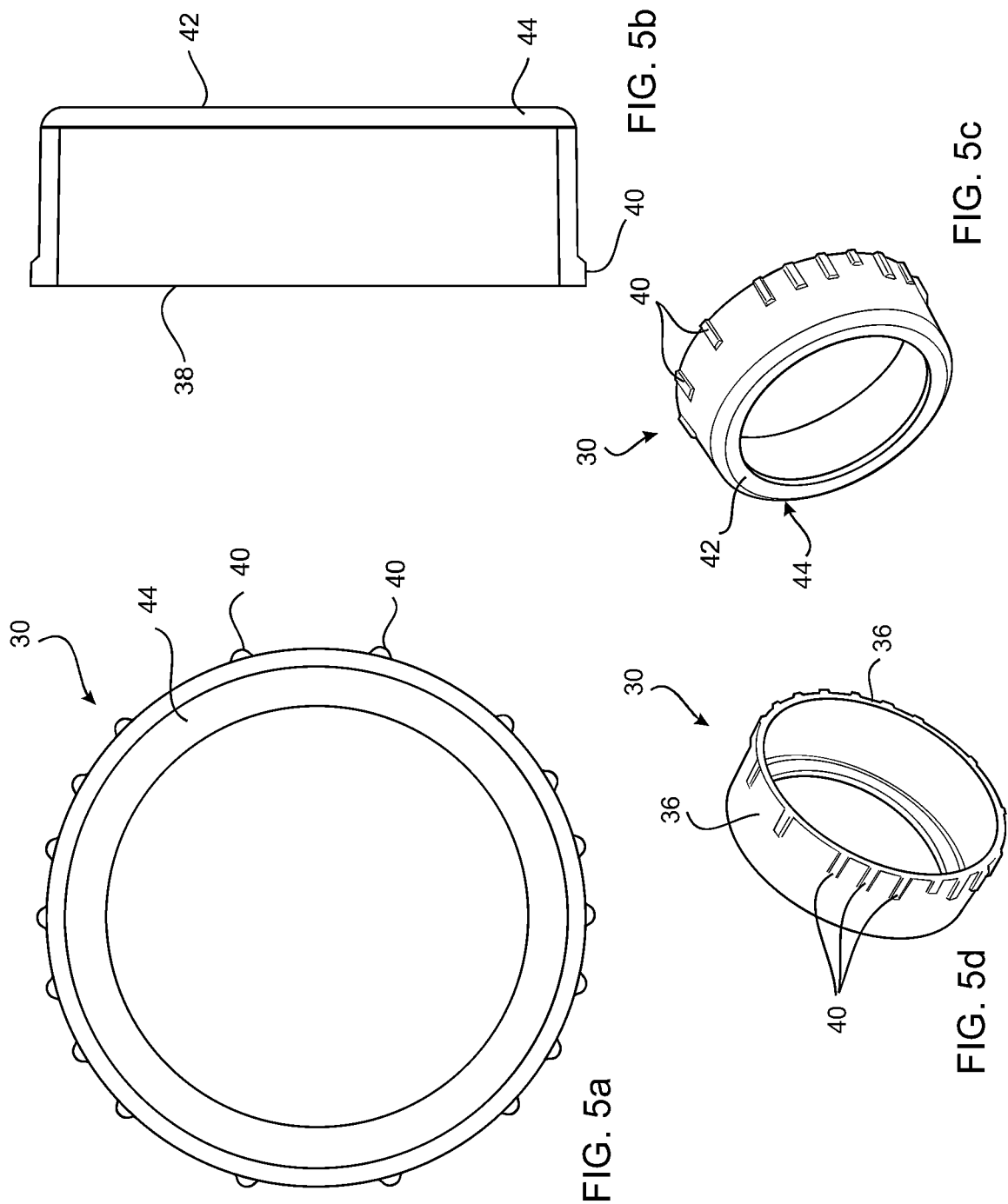

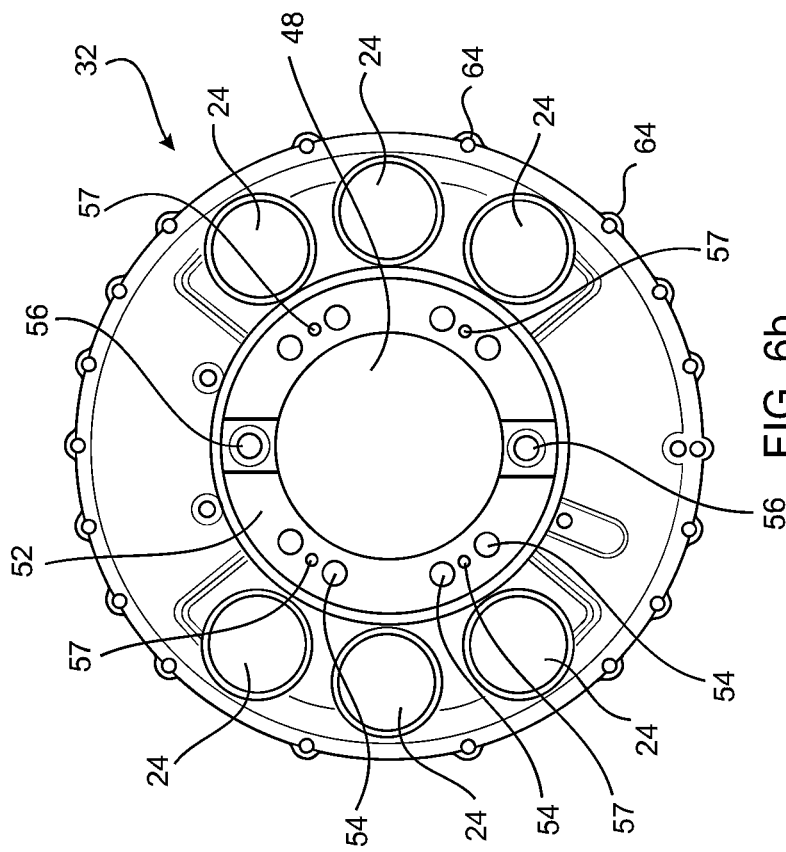
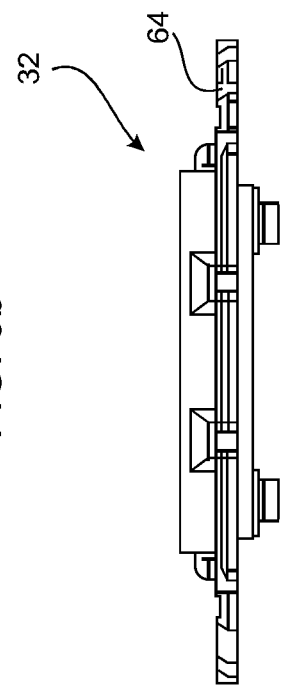
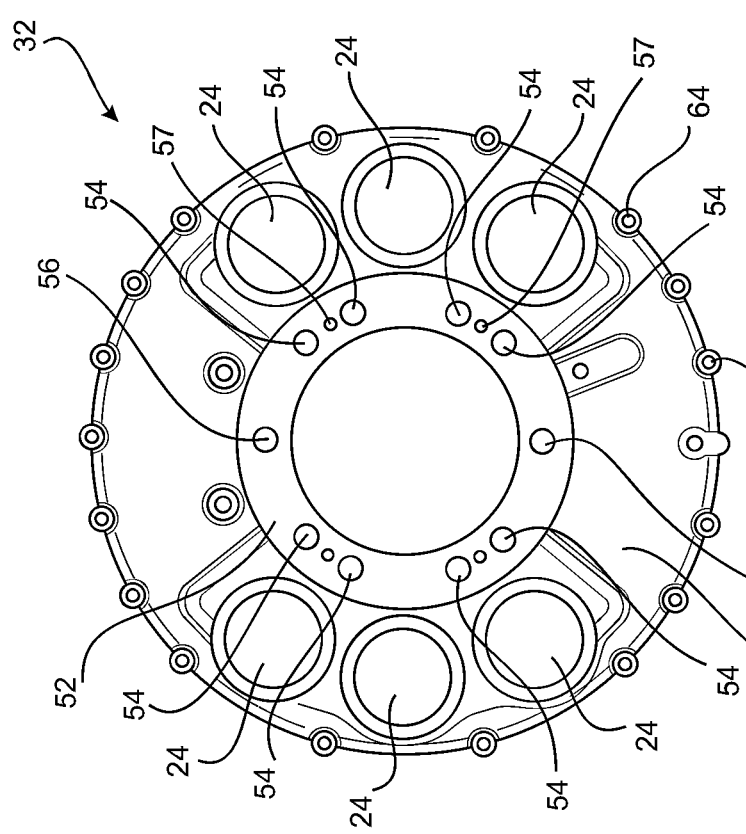
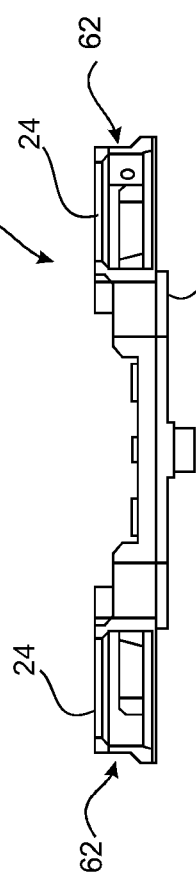
FIG. 6a
FIG. 6b
FIG. 6c
FIG. 6d

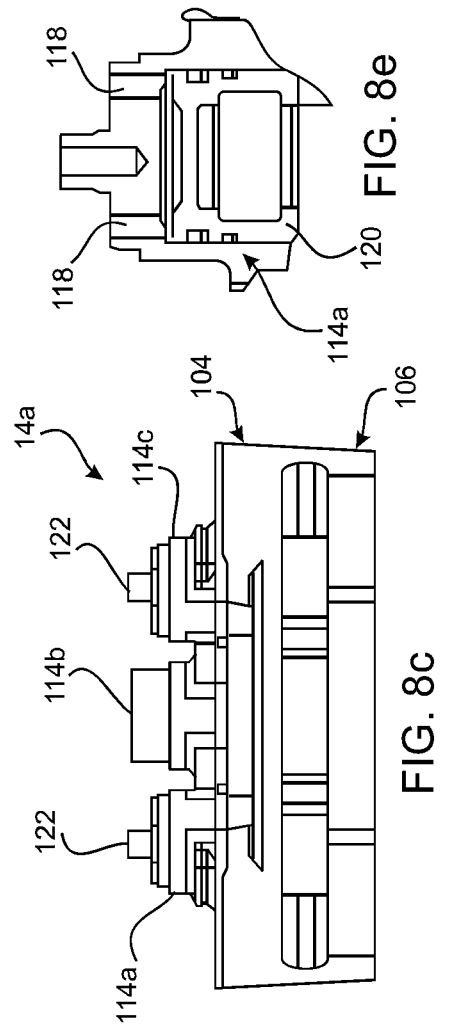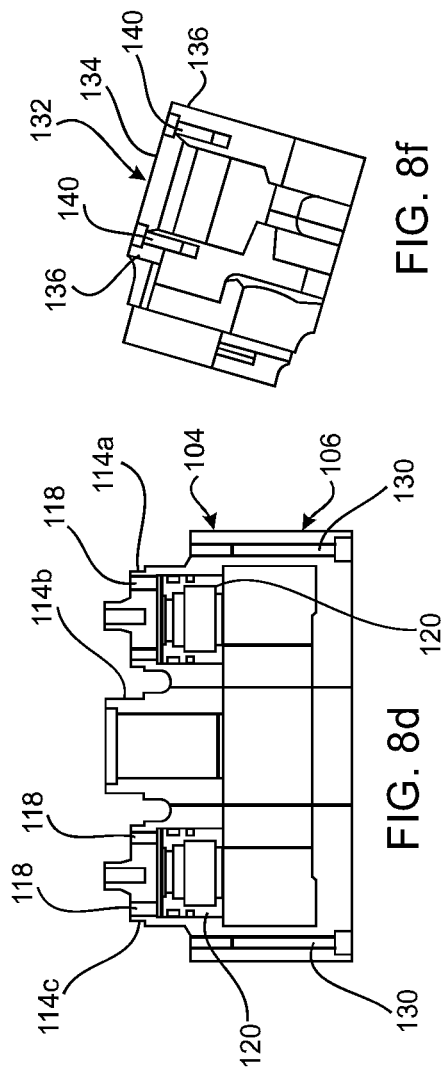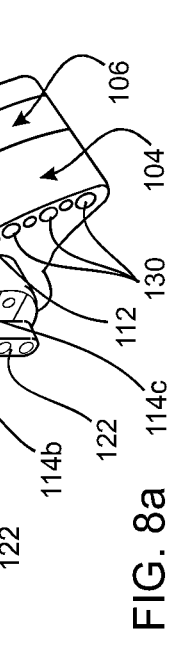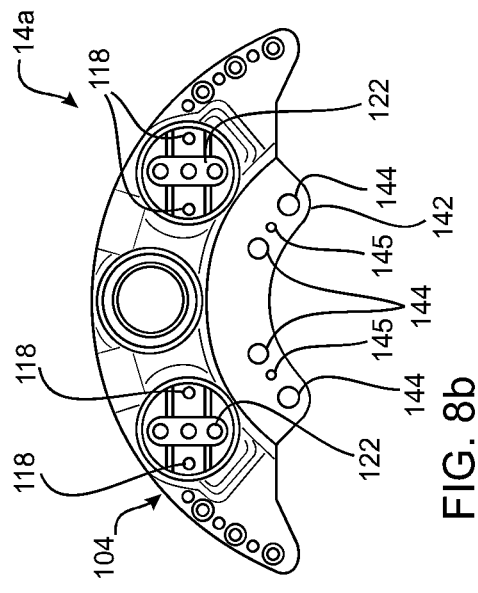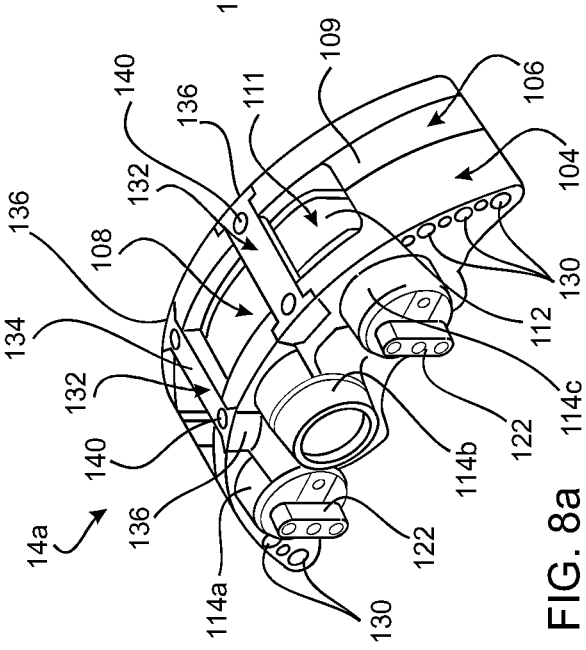

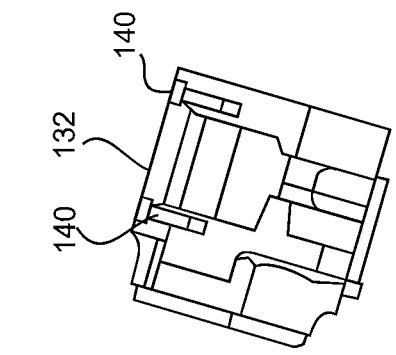
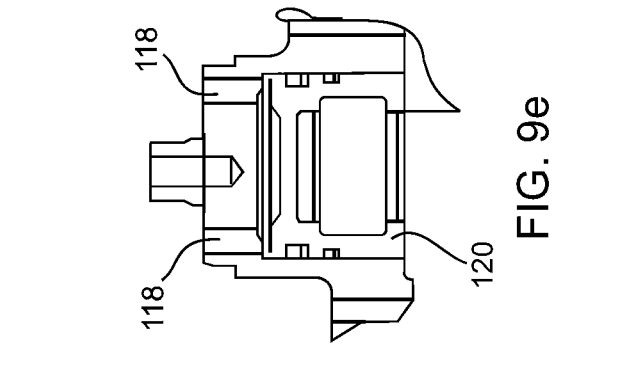
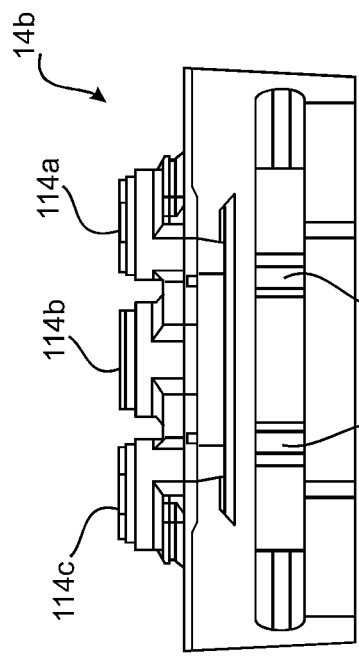
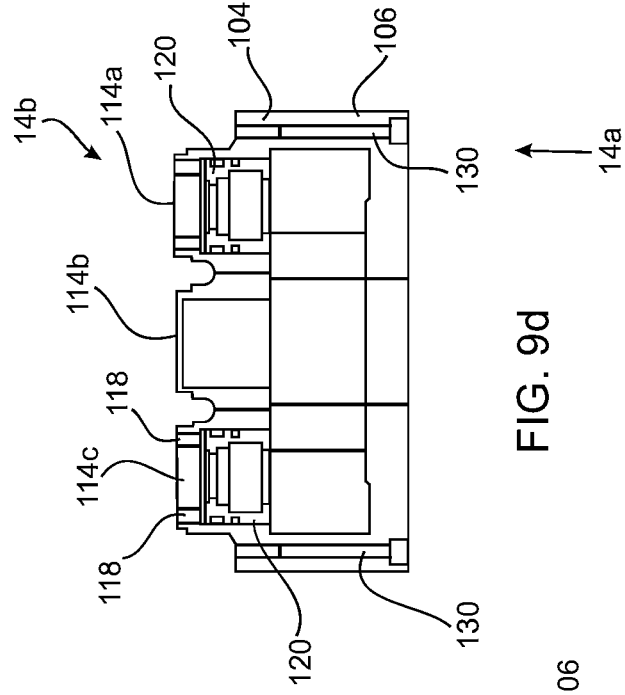
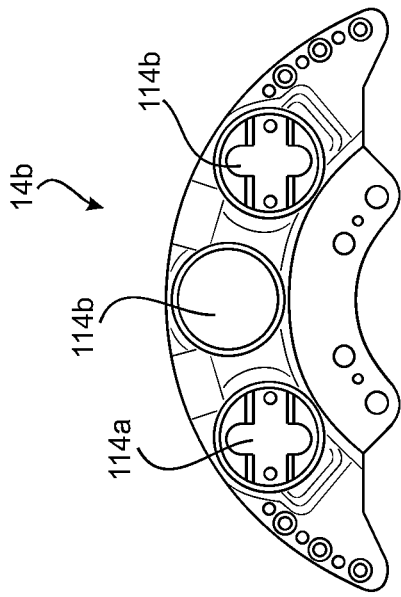
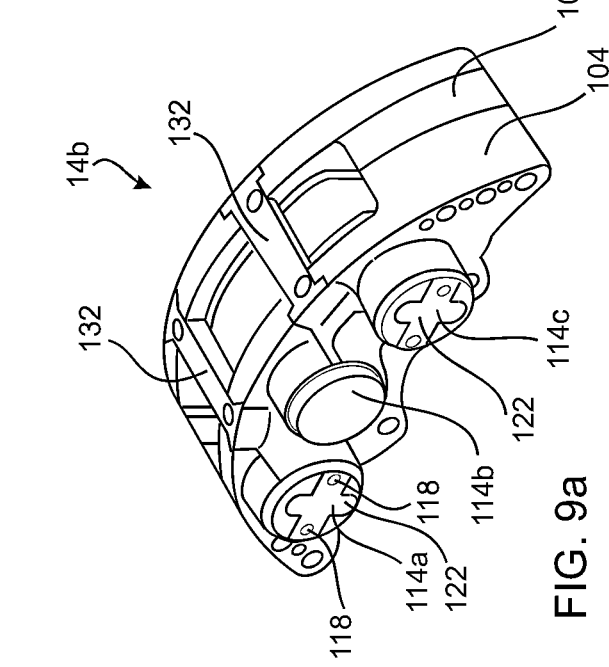

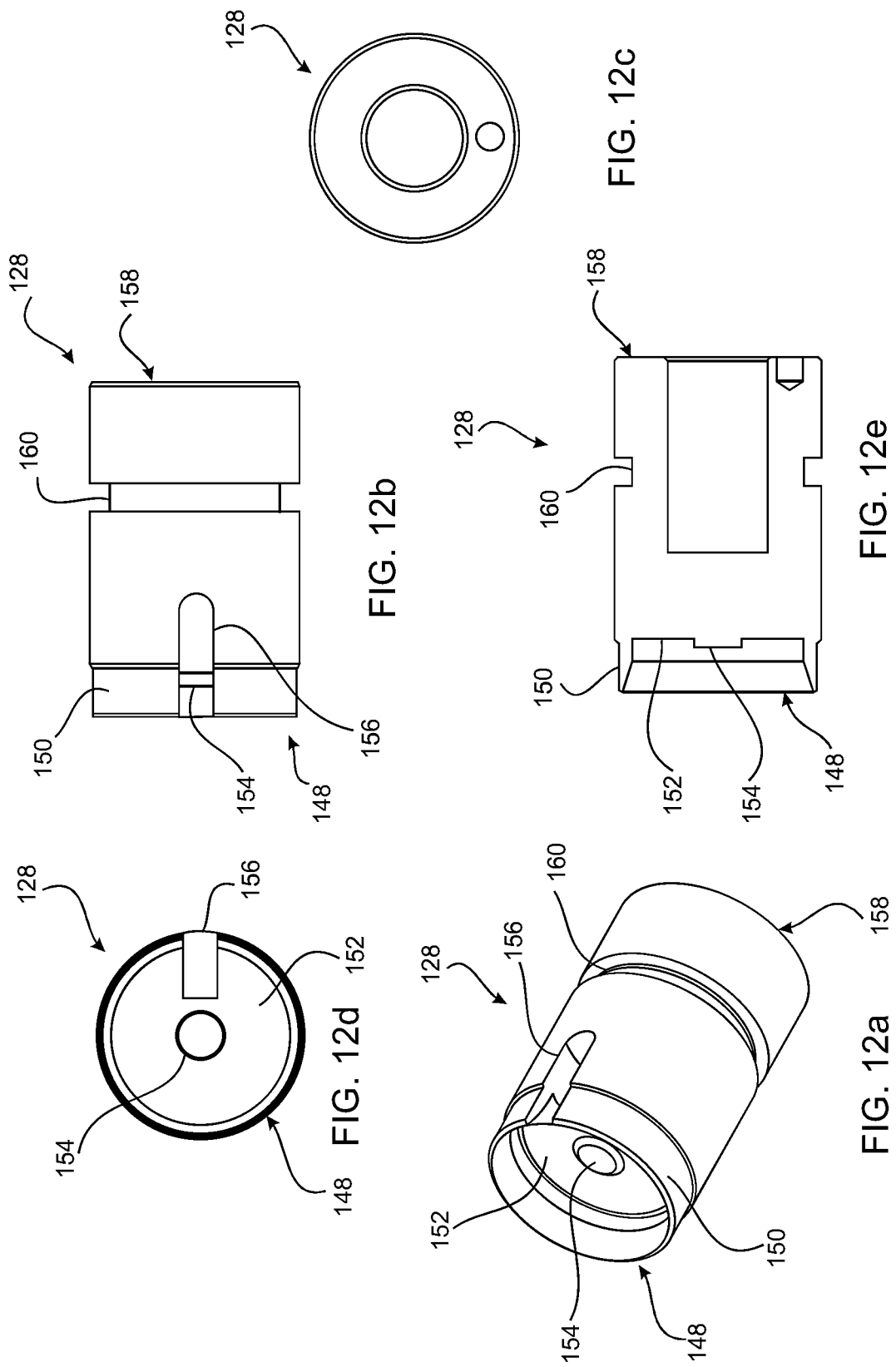

WET DISC BRAKE SYSTEM

This application is a continuation of Patent Cooperation Treaty Application PCT/AU2010/001653, filed Dec. 8, 2010, which claims priority to Australian Patent Application 2009905982, filed Dec. 8, 2009; which are incorporated herein by reference.

FIELD OF THE INVENTION

The present invention relates to a disc brake system, and in particular, but not exclusively, to a wet disc brake system that is suitable for heavy vehicles which undergo a large number of braking events.

BACKGROUND OF THE INVENTION

The present invention was developed to provide a solution to the high cost in servicing and maintaining the braking system of a garbage truck. As an example, one municipal authority indicated that a typical single front axle, tandem rear axle, garbage truck having a tare weight of over 11,500 kg, with 419 mm×152 mm (6") S-cam brake drums on the front axle, and 419 mm×178 mm (7") S-cam brake drums on the rear axle, requires a rear brake overhaul every six months, and a front brake overhaul every 12 months. This maintenance schedule incurs an annual cost in the order of US$6,000-US$8,700.

While the present invention was developed to reduce braking system maintenance costs for a garbage truck, embodiments of the invention are not limited to such applications. Embodiments of the invention may be applied to other vehicles including other types of truck or heavy vehicle such as buses irrespective of whether a braking profile for the truck comprises a relatively large number of braking events.

SUMMARY OF THE INVENTION

One aspect of the invention provides a wet disc brake system comprising:
- a housing configured to form a sealed cavity about a body rotating relative to the housing;
- one or more brake callipers disposed in the housing, the brake callipers provided with one or more cylinders, the housing being provided with an opening for each of the cylinders, wherein each cylinder is seated in a respective opening.

The housing may comprise an outer casing which extends circumferentially about the one or more callipers, and a first plate demountably coupled to the outer casing, wherein the first plate is provided with the openings for the cylinders.

The wet disc brake system may comprise a respective seal located between each cylinder and forming a seal between that cylinder and a corresponding opening in which that cylinder is seated.

The first plate may comprise a plurality of holes through which fasteners pass to attach the callipers to an axle housing wherein load on the calliper during braking is transferred to the axle housing via the fasteners.

In one embodiment the outer casing has opposite first and second axial ends and a lip projection radially inward extending about the second axial end.

The housing may comprise a second plate demountably attached to the lip of the outer casing, the second plate provided with an opening for recovering a hub which extends into the housing.

The second plate may be formed with an outer diameter greater than an inner diameter of the lip and wherein the second plate is disposed on a side of the lip inside of the outer casing.

The second plate may comprise an axially extending boss which defines the opening in the second plate for receiving the hub, the boss having a circumferential seat, and a seal on the seat which forms a liquid seal about the hub.

Each calliper may comprise first and second shells demountably coupled together, the first shell provided with the plurality of cylinders, the first and second shells being relatively shaped to form a cavity therebetween and through which the body rotates, the cavity opening onto an outer surface of the calliper to form a gap between the shells.

Each calliper may comprise at least one strap extending across the gap and coupled to each of the first and second shells.

Opposite ends of each strap may seat in respective recesses formed in the first and second shells.

A second aspect of the invention may provide a brake system comprising a service and park brake calliper provided with at least two cylinders wherein at least one of the cylinders houses a hydraulic operated service piston to facilitate a service braking, and at least one cylinder housing a park piston which is applied by a spring and released by air pressure to facilitate a park braking.

The brake system may further comprise a wear compensating actuator which transmits pressure from the spring to the park piston.

The park piston may comprise a central raised land against which pressure from the spring is transmitted by the wear compensating actuator to the park piston.

At least two of the cylinders may house respective service pistons, and at least one cylinder may house the park piston is disposed between the cylinders housing the service pistons.

A third aspect of the invention may provide a heavy vehicle comprising:
- a receptacle configured to transport material;
- an air compressor;
- a braking system driven by compressed air from the air compressor to brake motion of the heavy vehicle the brake system comprising a service brake and a park brake, the service brake being a wet air over hydraulic actuated disc brake, and the park brake being a spring applied and air released.

The braking system may comprise at least one brake calliper configured to provide both service brake and park brake.

The brake system may comprise service brakes on at least one axle of the heavy vehicle, and a combination of service and park brakes on at least one rear axle.

The heavy vehicle may have a tare weight of at least 6 tonnes. In alternate embodiments the heavy vehicle may have a tare weight of at least 10 tonnes, or at least 12 tonnes. In a further embodiment the heavy vehicle may have a tare weight of at least 16, 24 or 30 tonnes.

In one embodiment the heavy vehicle is a garbage truck and the receptacle is arranged to hold and compress waste matter.

The braking system for the heavy vehicle may comprise the wet brake system according to the first aspect of the invention.

A fourth aspect of the invention may comprise a method of overhauling an air operated drum brake system on a heavy vehicle having an air compressor and a drum brake assembly and a hub on one or more axles, the method comprising:
- removing the hub and associated drum brake assembly from respective axles; and, fitting a brake system according to the first or second aspect of the invention to the respective axles together with a corresponding hub.

The method may comprise preassembling the brake system together with the corresponding hub remote from the heavy vehicle and subsequently fitting the preassembled brake system and hub onto a corresponding axle.

Fitting the preassembled brake system and hub onto a corresponding axle may comprise using mechanical fasteners to attach the callipers in the brake system to a housing of the axle wherein load applied to the callipers during a braking operation is transferred by the fasteners to the axle housing.

The method may comprise configuring at least one of the callipers to provide a service brake and coupling an air over hydraulic actuator between the air compressor and the at least one of the callipers to enable hydraulic actuation of the service brake.

The method may comprise configuring at least one of the callipers which provide a service brake to also provide a park brake.

The method may comprise operating the park brake as a spring applied air release park brake.

The invention also provides a brake housing for a vehicle brake system having a rotor and one or more brake calipers capable of selectively applying braking force to the rotor, each caliper having one or more cylinders and associated pistons: the housing configured to circumferentially surround the rotor and the or each caliper, and provided with one or more openings for seating the cylinders.

The brake housing may comprise seals capable of forming seals about the openings in the housing.

In invention further provides a brake system for a vehicle comprising:
a rotor;
  one or more brake calipers capable of selectively applying braking force to the rotor, each caliper having one or more cylinders and associated pistons;
  a housing configured to circumferentially surround the rotor and the or each caliper, and provided with one or more openings for seating the cylinders;
  a structural component coupled to the vehicle and wherein the housing is coupled to the structural component; and,
  one or more fasteners which couple the one more calipers to the structural component wherein load generated by operating the calipers to apply braking force to the rotor is transferred through the fasteners to the structural component.

In the brake system at least one cylinder of each caliper is provided with a hole capable of coupling with a hose to supply brake fluid to the cylinder and associated piston to facilitate operation of a corresponding caliper, the hole in the cylinder being located within the opening of the housing.

The housing or the brake system may be arranged so that the housing is non structural and substantially decoupled from reactive forces generated during a braking operation.

BRIEF DESCRIPTION OF THE DRAWINGS

An embodiment of the present invention will now be described in the context of a wet brake system by way of example only with reference to the accompanying drawings in which:

FIG. 5a is a front view of an outer casing of a housing assembly incorporated in the wet disc brake system;

FIG. 5b is a view of section A-A of the outer casing shown in FIG. 5a;

FIG. 5c is a perspective view from the front of outer casing;

FIG. 5d is a perspective view from the rear of the outer casing;

FIG. 6a is a rear view of an inner plate incorporated in the housing assembly;

FIG. 6b is a front view of the plate shown in FIG. 6a;

FIG. 6c is a side view of the inner plate;

FIG. 6d is a view of section A-A of the inner plate shown in FIG. 6a;

FIG. 7b is a view of section A-A of the seal carrier shown in FIG. 7a;

FIG. 8a is a perspective view of a service and park brake calliper incorporated in the wet disc brake system;

FIG. 8b is a side view of the calliper shown in FIG. 8a;

FIG. 8c is a plan view from the bottom of the calliper shown in FIG. 8a;

FIG. 8d is a view of section A-A of the calliper shown in FIG. 8b;

FIG. 8e is a view of detail B shown in FIG. 8b;

FIG. 8f is a view of section C-C of the calliper shown in FIG. 8b;

FIG. 9a is a perspective view of a two piston calliper incorporated in an embodiment of the wet disc brake system;

FIG. 9b is a side view of the calliper shown in FIG. 9a;

FIG. 9c is a plan view from the bottom of the calliper shown in FIG. 9a;

FIG. 9d is a view of section A-A of the calliper shown in FIG. 9b;

FIG. 9e is a view of detail B shown in FIG. 9d;

FIG. 9f is a view of section C-C of the calliper shown in FIG. 9b;

FIG. 10b is a side view of the calliper shown in FIG. 10a;

FIG. 10c is a plan view from the bottom of the calliper shown in FIG. 10a;

FIG. 11b is a plan view of the strap shown in FIG. 11a;

FIG. 12a is a perspective of a park piston incorporated in the service and park brake calliper shown in FIGS. 8a-8e;

FIG. 12b is a side view of the piston shown in FIG. 12a;

FIG. 12c is a view of one end of the park piston shown in FIG. 12a;

FIG. 12d is an opposite end view of the park piston shown in FIG. 12a;

FIG. 12e is a view of section A-A of the park piston shown in FIG. 12c;

FIG. 15a is an elevation view of an inner plate incorporated in a second embodiment of the braking system;

FIG. 15b is a view of section A-A of the inner plate shown in Figure a;

FIG. 15c is a perspective view of the inner plate shown in FIG. 15a from the rear;

FIG. 15d is a perspective view of the inner plate shown in FIG. 15a from the inside;

FIG. 19a is a section view of a wheel bearing seal that may be incorporated in the wet brake system; and, FIG. 19b is a view of detail B shown in FIG. 19a.

DETAILED DESCRIPTION OF PREFERRED EMBODIMENT

Figure 1:
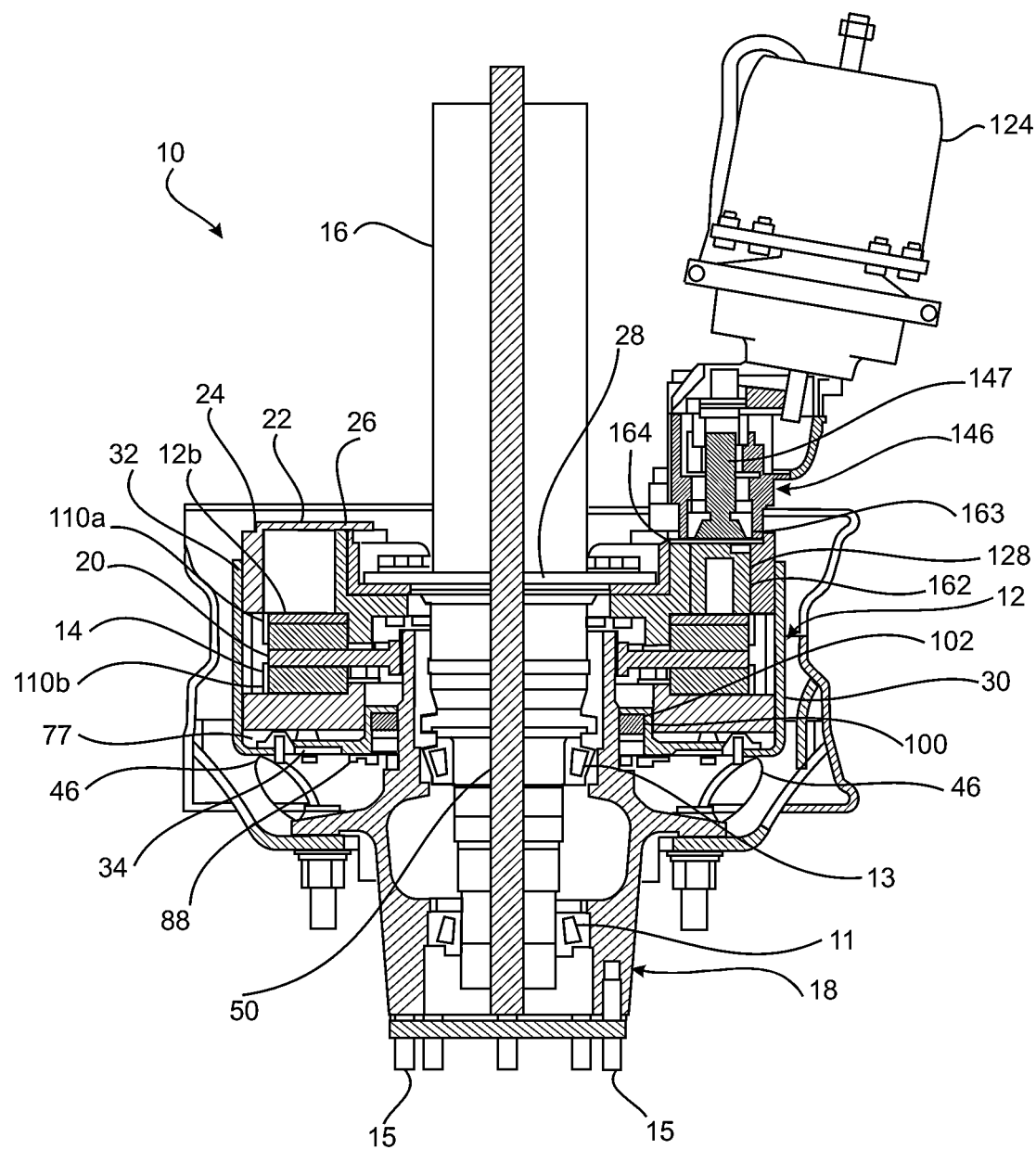
FIG. 1 is a section view of an embodiment of the wet disc brake system mounted on an axle.
Figure 2:
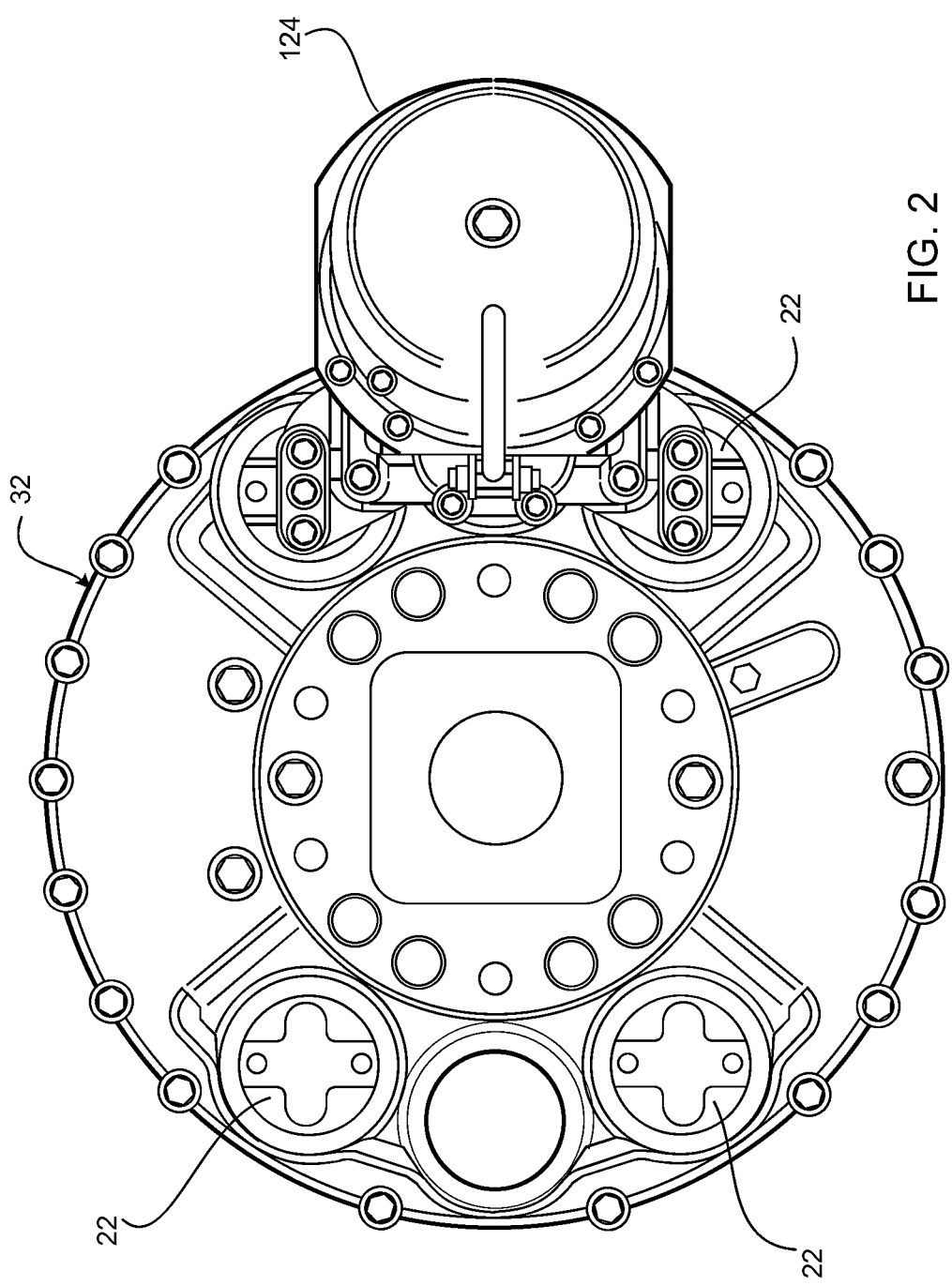
FIG. 2 is a rear view of the wet disc brake system shown in FIG. 1.
Figure 3:
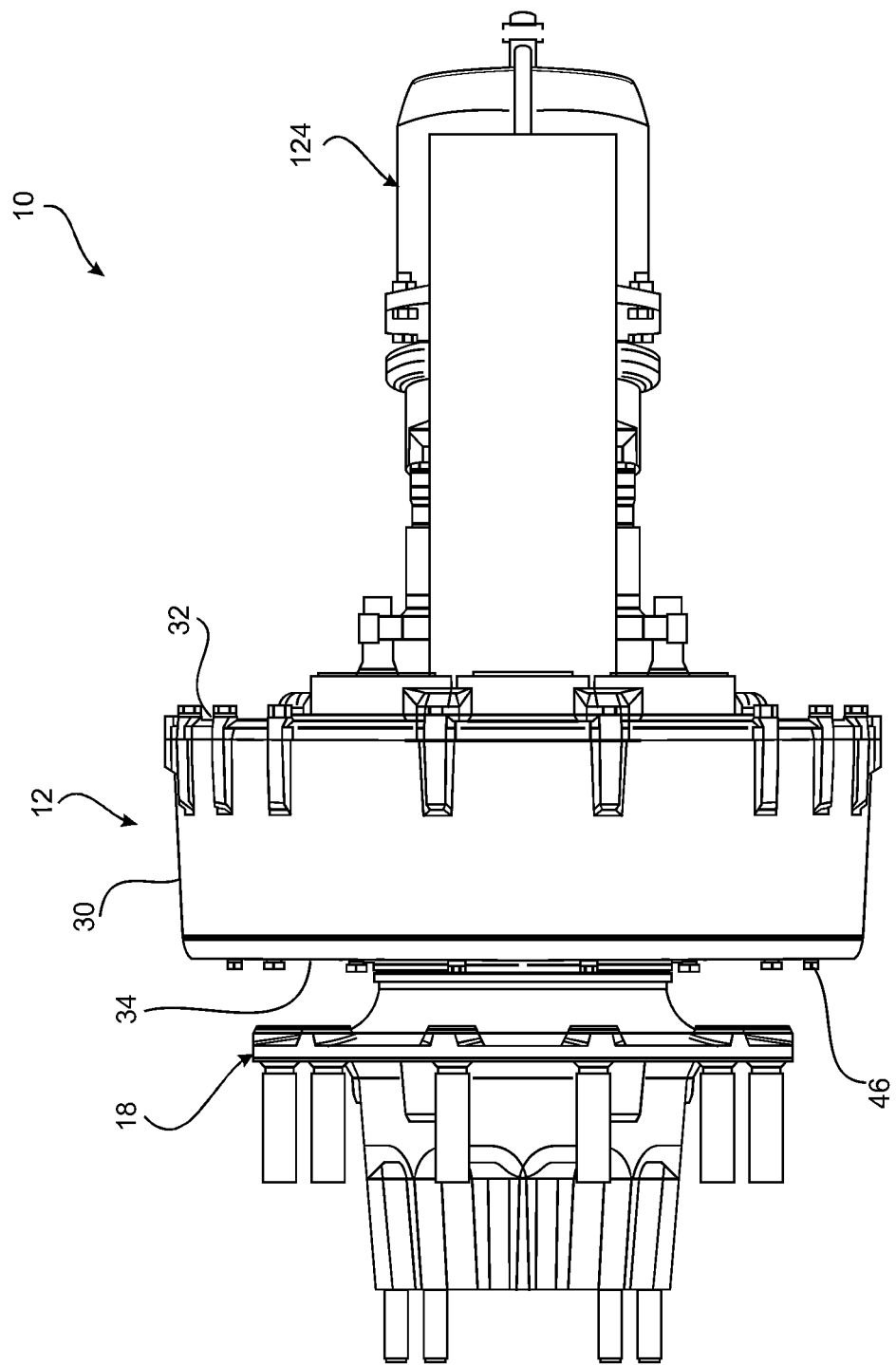
FIG. 3 is a plan view of the wet disc brake system shown in FIGS. 1 and 2.
Figure 4:
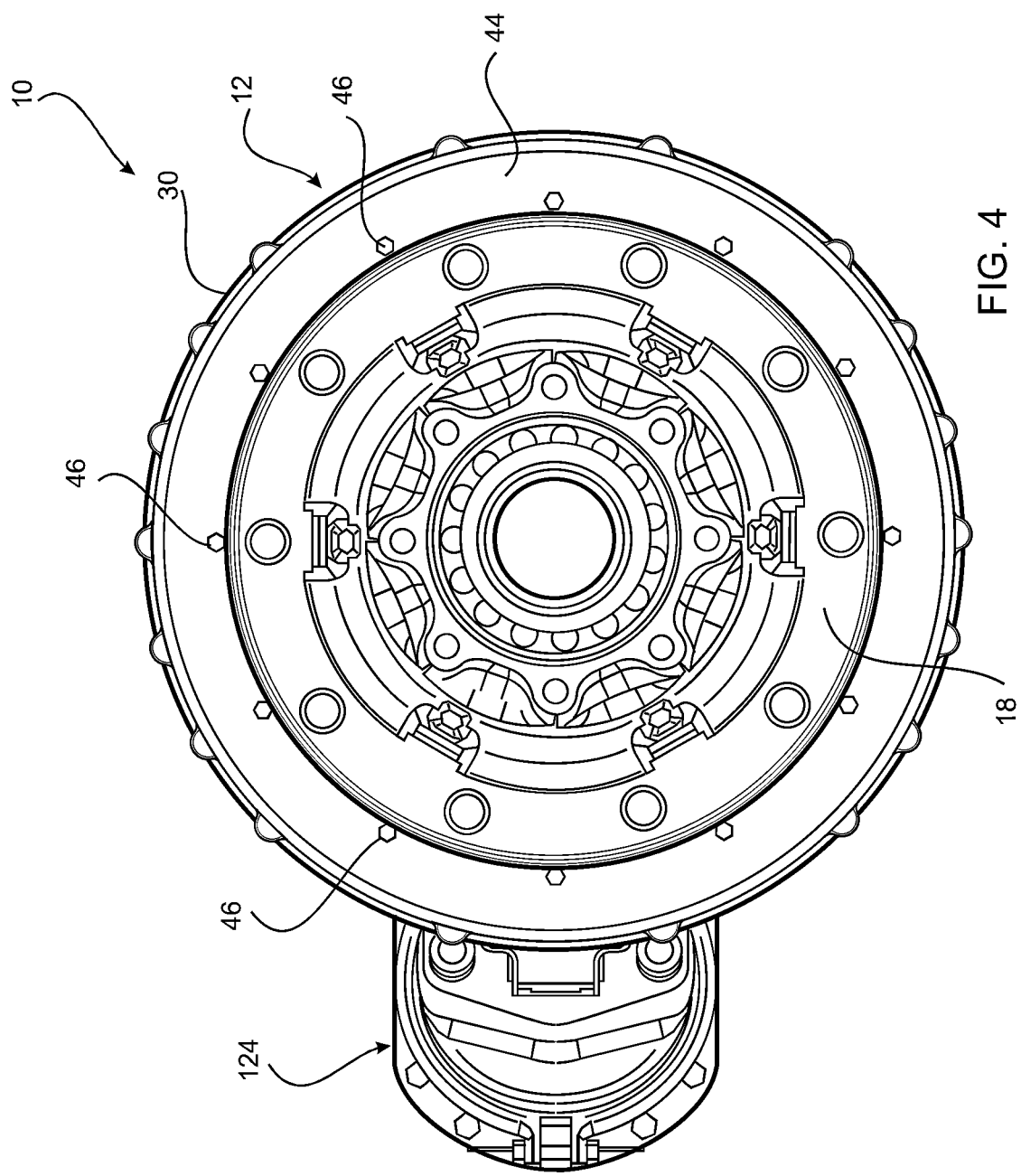
FIG. 4 is a front view of the wet disc brake system.

With reference to the accompanying figures and in particular FIGS. 1-4 in the context of a wet disc brake system 10 an embodiment of the present invention comprises a number of interacting components and assemblies including a housing assembly 12 and brake callipers 14. The housing assembly 12 forms a liquid tight seal between an axle housing 16 and a wheel hub 18 to enclose and retain a volume of lubricant (not shown) for the wet disc brake system 10. A rotor 20 is splined onto and thus rotates with the hub 18. The rotor 20 is lubricated by the lubricant as it rotates within the housing 12 and brake callipers 14. A portion of the brake callipers 14, and in particular cylinders 22 of the brake callipers 14, extend into and are seated in openings 24 formed in the housing assembly 12. O rings 26 are provided in the opening 24 to form a seal between the housing assembly 12 and the cylinders 22. Seating the cylinders 22 in the openings 24 enables coupling to mechanical, hydraulic or pneumatic actuators for operating the callipers 14. The callipers 14 are coupled to a structural component in the form of flange 28 extending about the axle housing 16. Accordingly reactive forces created during a braking operation are transmitted via the callipers 14 to the flange 28 and axle housing 16 rather than being born by the housing assembly 12. This enables the housing assembly 12 to be made of a relatively light weight construction and/or materials such as aluminium because housing assembly 12 that bears minimal load.

Figure 7A:
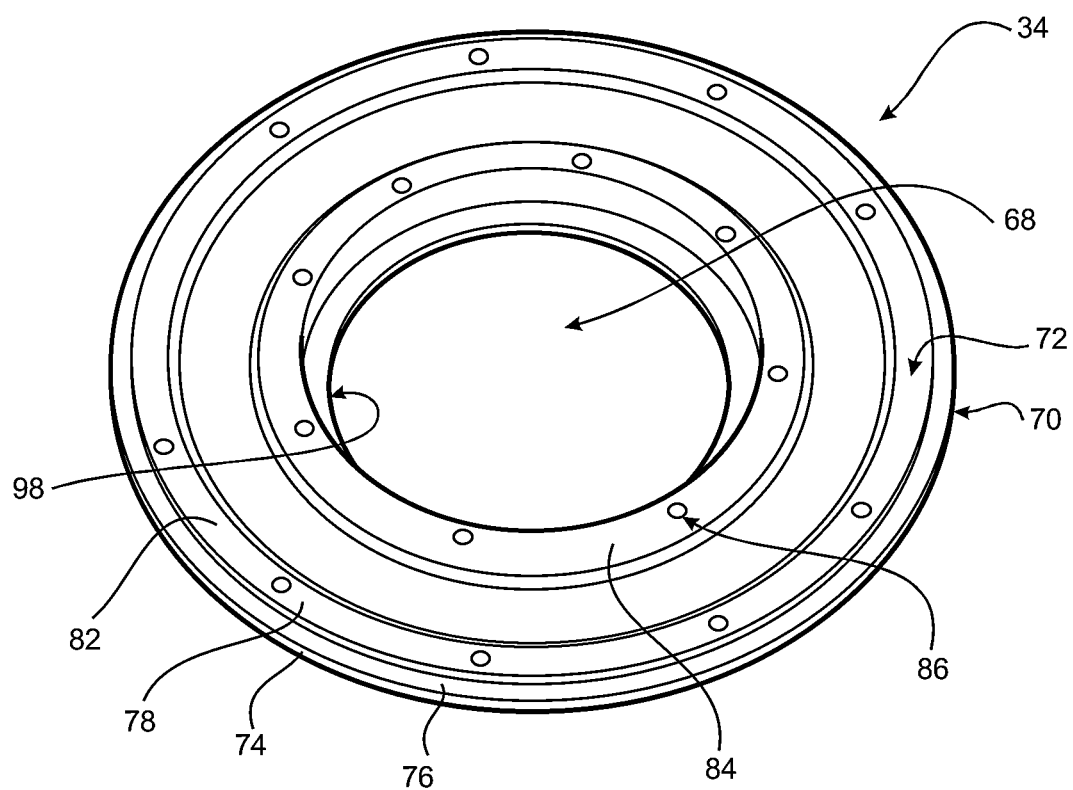
FIG. 7a is a representation of seal carrier incorporated in the housing assembly.
Figure 7B:
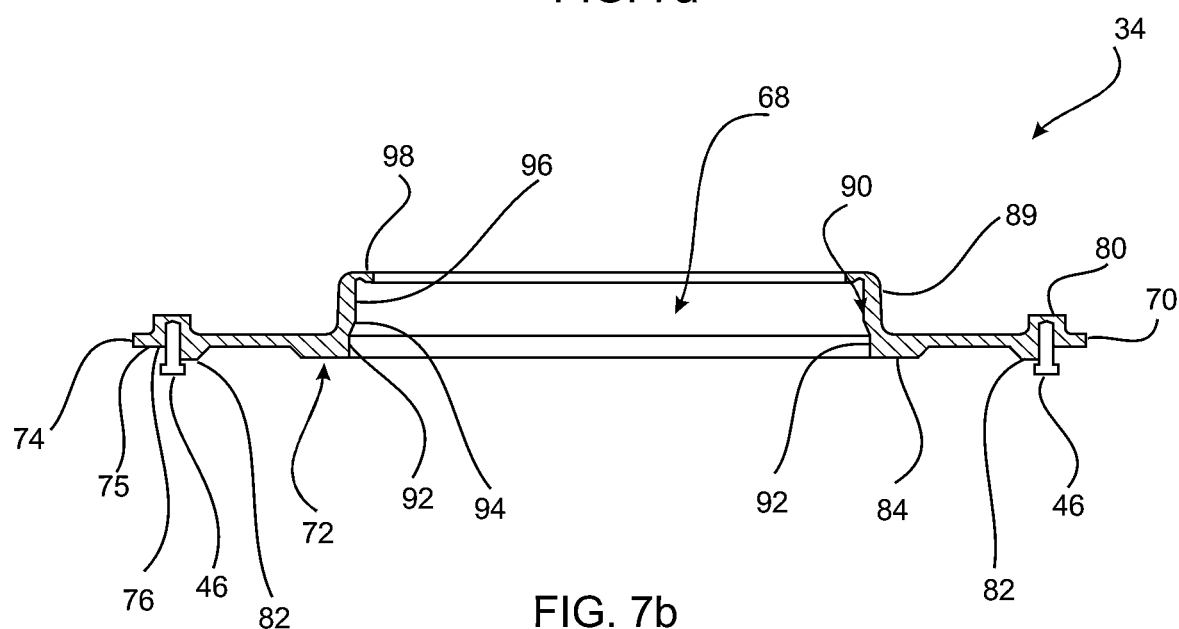
Figure 10F:
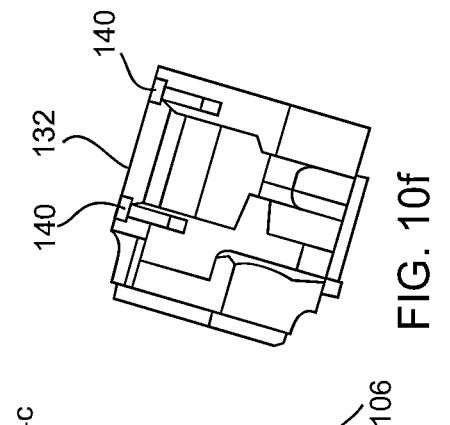
FIG. 10f is a view of section C-C of the calliper shown in FIG. 10b.
Figure 10E:
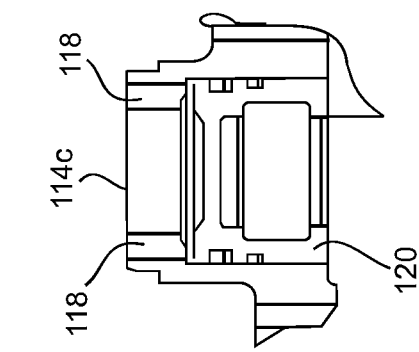
FIG. 10e is a view of detail B of the calliper shown in FIG. 9d.
Figure 10C:
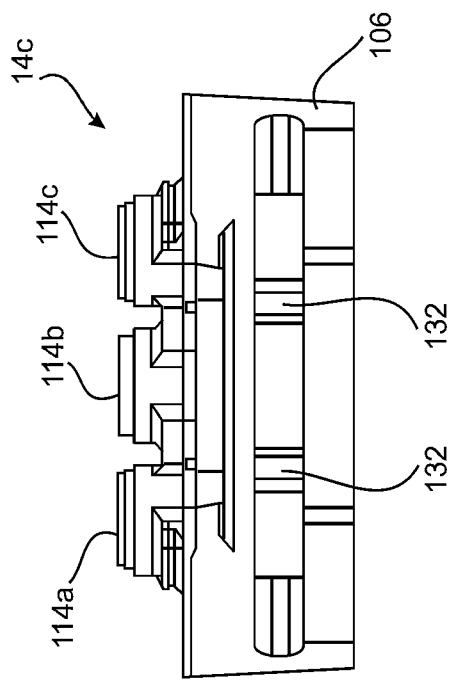
Figure 10D:
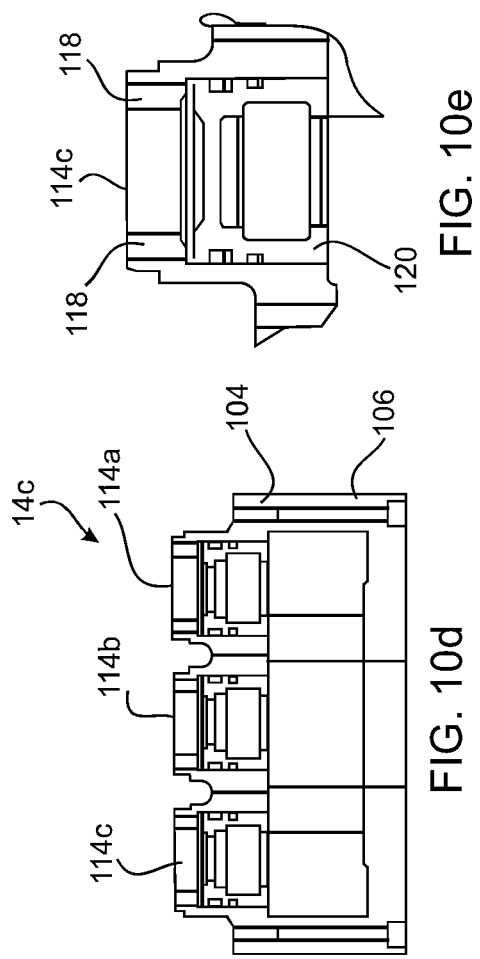
FIG. 10d is a view of section A-A of the calliper shown in FIG. 10b.
Figure 10B:
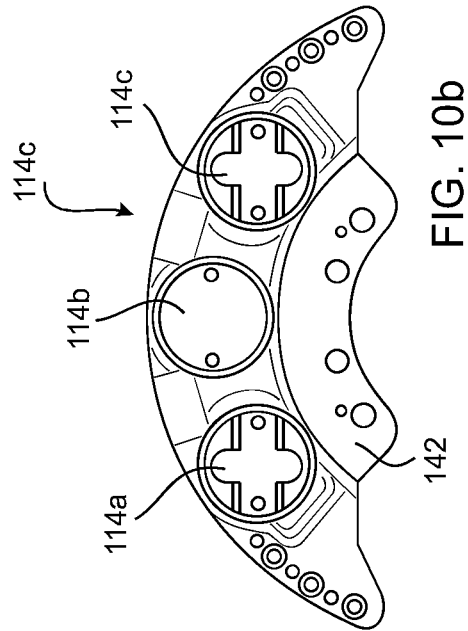
Figure 10A:
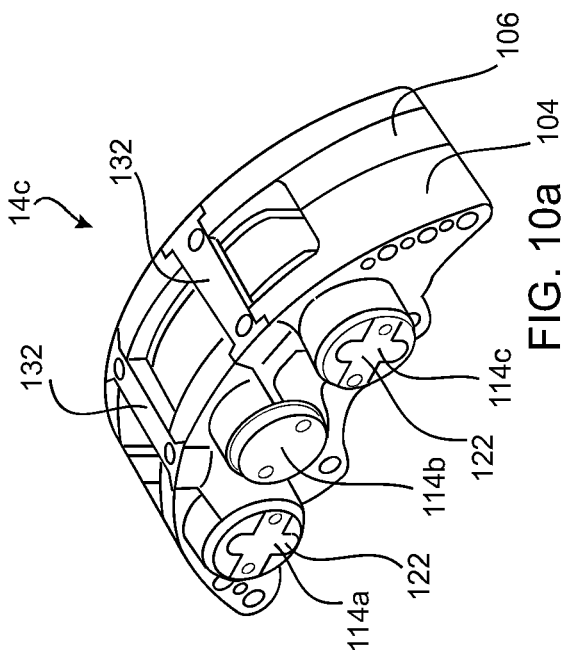
FIG. 10a is a perspective view of a three piston calliper incorporated in an embodiment of the wet disc brake system.
Figure 11A:
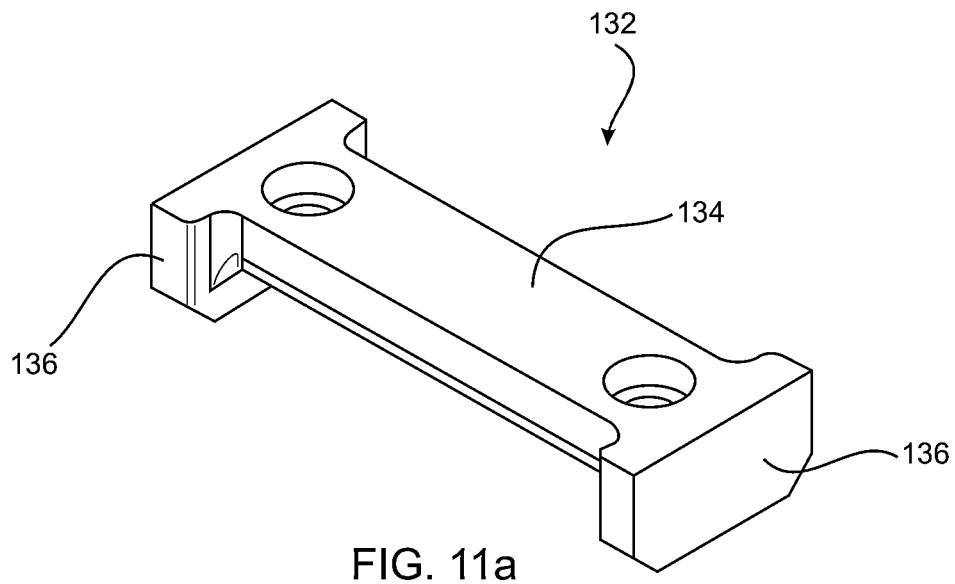
FIG. 11a is a perspective view of a strap incorporated in the callipers shown in FIGS. 8a-10e.
Figure 11B:
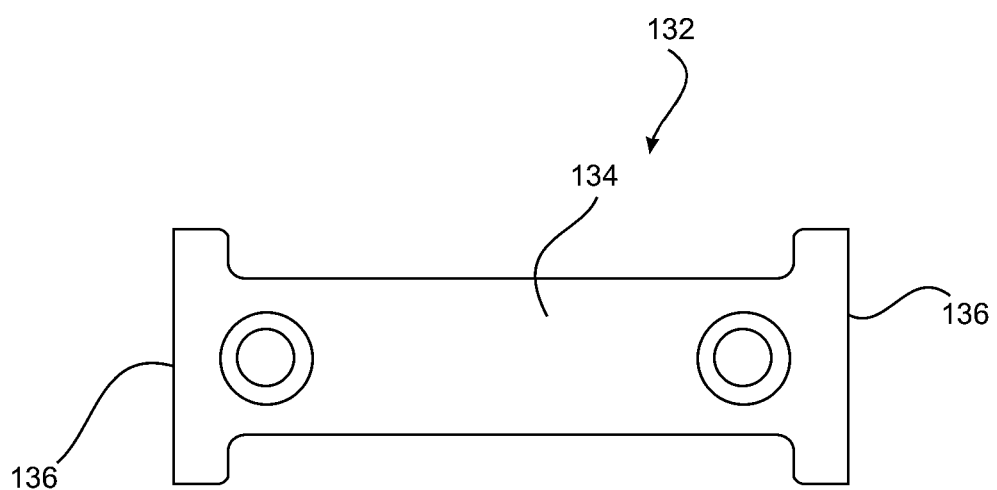

The housing assembly 12 comprises an outer casing 30 shown in FIGS. 1 and 5a-5d which extends circumferentially about the callipers 14; an inner plate 32 shown in FIGS. 6a-6d and a seal carrier in the form of a second plate 34 shown in FIGS. 1, 7a and 7b. With particular reference to FIGS. 5a-5d, the outer casing 30 comprises a circumferential wall 36 of constant inner diameter and provided, on an outside surface near one end 38, with a plurality of axially extending spaced apart and integrally formed ribs 40. The ribs 40 provide additional strength and thickness to the wall 36 for forming tapped holes to enable fastening of the inner plate 34. An opposite end 42 of the outer casing 30 is formed with a inwardly directed circumferential lip 44. The second plate 32 is fastened to the outer casing 30 by screws 46 (FIGS. 1, 3, 4) that pass through the lip 44.

With reference to FIGS. 6a-6d, the inner plate 32 is provided with a central opening 48 through which an axle housing 16 extends and which aids to centralise the brake housing relative to the hole 18. Surrounding the opening 48 is a fixing ring 52 by which the inner plate 32 and indeed the housing assembly 12 is coupled to the flange 28 on the axle housing 16. The fixing ring is provided with a plurality of holes 54 that register with holes formed in the brake callipers 14 as well as holes in the flange 28 enabling attachment of the callipers 14 to the flange 28. Further holes 56 are provided in the fixing ring 52 to couple the inner plate 32 to the flange 28. Additional smaller diameter holes 57 are formed in the fixing ring 52 to attach the inner plate 32 to the callipers 14.

The inner plate 32 is formed with a portion 58 radially outward of the fixing ring 52 in which is formed the openings 24 for the calliper cylinders 22. The openings 24 are, in this embodiment, arranged in two banks 62 each comprising three openings 24. The banks 62 are raised in relation to the portion 58 of the inner plate 32. The centres of the two end openings 24 in each bank 62 are separated by approximately 66°. A plurality of bosses 64 is formed about the outer circumferential surface of the inner plate 32 which align with the ribs 40 on the outer casing 30. The bosses 64 are formed with holes for receiving screws to fasten the inner plate 32 to the outer casing 30.

With reference to FIGS. 1, 7a and 7b, the second plate 34 is in the general form of an annular plate having: a central opening 68 through which fits the hub 18; and, an outer circumferential edge 70. The outer edge 70 has a diameter greater than the diameter of the lip 44 on the outer casing 30. When assembling the housing assembly 12, the plate 34 is inserted into the outer casing 30 from end 38. A face 72 of the plate 34 which faces outward from end 42 of the outer casing 30 abuts an inside of the lip 44. In board of the outer edge 70 on the face 72 the plate 34 is formed with an annular seat 74. This seat is provided with a circumferential groove 75 for seating an O-ring 77 (FIG. 1). Radially inward of the seat 74 there is a right angle circumferential shoulder 76 which forms one edge of annular band 78. The band 78 is provided with a plurality of blind holes 80 for threadingly engage the screws 46 which fasten the plate 34 to the lip 44 of the outer casing 30. A radial inner edge of the band 78 is delimited by an annular shoulder 82 that projects in the axial direction from the face 72. When the plate 34 is fitted to the outer casing 30, the lip 44 sits inside of and abuts the shoulder 82. Radially inward from the shoulder 82 the face 72 is provided with an inner circumferential band 84 having blind holes 86 to facilitate the attachment of a flange seal support 88 (shown in FIG. 1).

The plate 34 also comprises an axially projecting boss 89 having an inner circumferential surface 90 adjacent the inner band 84 which comprises a first portion 92 of constant diameter, a contiguous second portion 94 of progressively decreasing diameter, and a contiguous third portion 96 of constant diameter. Extending radially inward from the portion 94 is a circumferential lip 98. The inner diameter of the lip 98 defines the opening 68. A cassette seal 100 (see FIG. 1) is seated in the third portion 96 to form a rotary seal between the housing assembly 12 and an outer surface of the hub 18. A gasket seal 102 (FIG. 1) is disposed between the cassette seal 100 and the lip 98.

Embodiments of the wet brake system 10 incorporate three similar but different brake callipers. These comprise a service/park brake calliper 14a shown in FIGS. 8a-8f; a two piston brake calliper 14b shown in FIGS. 9a-9f; and a three piston calliper 14c shown in FIGS. 10a-10f. Referring to FIGS. 8a-8f, the park/service brake calliper 14a comprises an inner shell 104 and outer shell 106 which are coupled together to define a cavity 108 in which the rotor 20 rotates and which houses opposing brake pads 110a and 110b (shown in FIG. 1). The cavity 108 opens onto an outer circumferential surface 109 of the calliper 14a forming a central gap 111 between the shells 104 and 106. The brake pad 110a is seated in a recess 112 formed on an inside of the outer shell 106.

The inner shell 104 is formed with three cylinders 114a, 114b and 114c (hereinafter referred to in general as "cylinders 114"). Each of the cylinders 114a and 114c is provided with holes 118 to allow connection to hoses providing hydraulic fluid to respective service brake pistons 120 retained in the cylinders 114a and 114c. Extending transversely between the holes 118 on each cylinder 114a and 114c is a land 122 to facilitate connection of a spring canister 124 (shown in FIG. 1). The spring canister is pneumatically operated to provide the park brake aspect of the service/park brake calliper 114a.

Seated on the inside of the outer shell 104 is a reaction plate 126 (shown in FIG. 1) which is in the form of a steel plate of a shape and configuration similar to the brake pad 110a. The reaction plate 126 extends across each of the pistons 120 held in the cylinders 114a and 114c as well as a park brake piston 128 (shown in FIGS. 1 and 12a-12e) disposed within the cylinder 114b.

The inner and outer shells 104 and 106 are coupled together by sets of bolts 130 that extend from the shell 104 to the shell 106 and from the shell 106 into the shell 102. The bolts 130 are located near the ends of the shells 104 and 106 on the side of the service brake cylinders 114a and 114c distant the cylinder 114b. In addition, metal straps 132 bridge the cavity 108 and are coupled to both of the shells 104 and 106 to provide bracing to the calliper 14a. The straps 132 are provided one on each side of the cylinder 114b. Each strap 132 is in the general shape of a "I" having a central column 134 and cross members 136 at opposite ends. The cross members 136 locate in complimentary shaped recesses formed in the inner and outer shells 104 and 106 with the cross members 136 sitting flush with outer axial faces of the shells 104 and 106. Bolts 140 fix the straps 132 to the shells 104 and 106.

A mounting flange 142 is formed integrally with the inner shell 104 to facilitate attachment of the calliper 14a to the flange 28 on the axle housing 16. To this end the mounting flange 142 is provided with holes 144 and 145 that register with the holes 54 and 57 respectively in the fixing ring 52 of the inner plate 32.

The park brake piston 128 (see FIGS. 1, 8a, 8c, 8d and 12a-12e) is housed within the cylinder 114b and is acted upon by the spring canister 124 via a wear compensating mechanism 146 which includes a rod 147 (see FIG. 1). One end 148 of the piston 128 is formed with an axially projecting ring 150. Inside of the ring 150 the piston 128 is provided with a radial face 152 which is formed with a central raised land 154. A slot 156 extends axially on the piston 128 from the ring 150 to a distance approximately one third of the way toward an opposite end 158 of the park piston 128. A circumferential groove 160 is formed about the park piston 128 between the slot 156 and the end 158 for seating an O-ring 162 (shown in FIG. 1). The slot 156 accommodates a pin 163 which extends from a face 164 of the rod 147. The face 164 abuts the raised land 154 and is located within the ring 150 of the piston 128.

The land 154 provides a pivot between the rod 147 and the interface piston 128. This provides a means of self-alignment between the rod 147 and the piston 128, allowing lateral movement or rocking at the face due to: the length of the rod 147; and, the mechanism 146 which multiplies the force of the canister 124 comprising a pivoted lever arrangement.

Wear of the brake pads 110a and 110b is compensated for in relation to application of the park brake by the mechanism 146 which causes a housing of the rod 147 to rotate about a longitudinal axis of the rod 147 as the rod 147 is advanced linearly by application of force by the spring canister 124. This rotation maintains the rod 147 in a linearly advanced position relative to its position prior to application of force by the spring canister 124 to provide wear compensation.

The two piston calliper 14b is shown in FIGS. 9a-9f. Each feature of the calliper 14b which is identical to corresponding features of the calliper 14a is denoted with the same reference number. The calliper 14b differs from the calliper 14a in the following two aspects. Firstly, the central cylinder 114b in the calliper 14b is closed and does not house any piston. Thus, braking force is applied only via the pistons 120 in the cylinders 114a and 114c. Secondly, as the calliper 14b does not have a park brake function, it does not require and therefore does not have the lands 122 depicted on the calliper 14a for mounting of the spring canister 124. In the embodiment of the braking system 10 shown in FIGS. 1-4, one piston calliper 14b is used together with a service/park brake calliper 14a to form a rear brake assembly for braking a wheel coupled to the hub 18.

FIGS. 10a-10f depict the three piston calliper 14c. Features of the calliper 14c which are identical to features of the callipers 14a and 14b are denoted with the same reference number. The three piston calliper 14c differs from the calliper 14b by the provision of a service piston 120 in the central cylinder 114b and the provision of holes 118 in the cylinder 116 to allow the application of hydraulic pressure to the piston 120.

Figure 13:
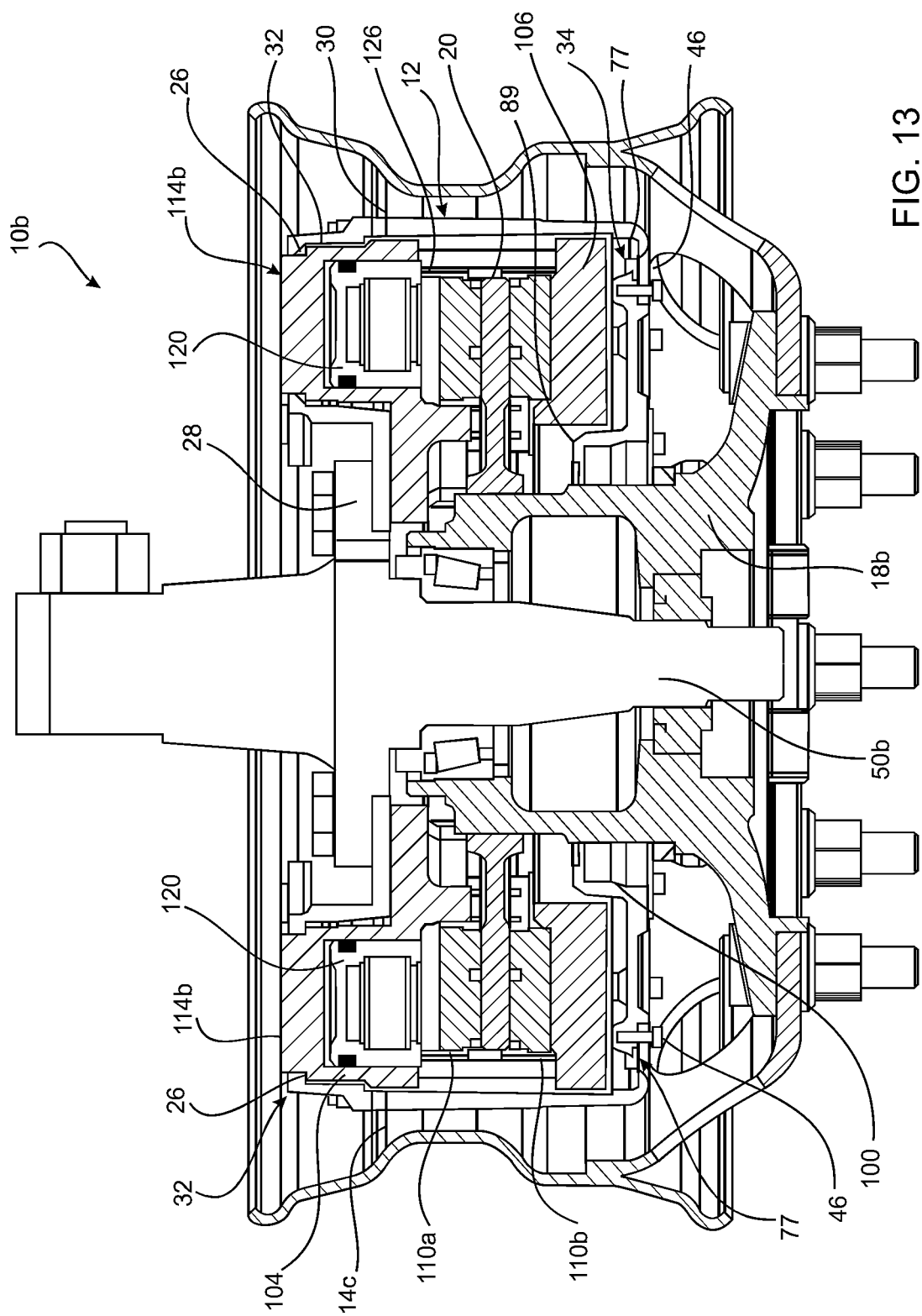
FIG. 13 is a section view of a second embodiment of the wet disc brake system.

FIG. 13 depicts an embodiment of the wet disc brake system 10b comprising a housing assembly 12 and two of the three piston callipers 14c held within the housing assembly 12 to brake a rotor 20 mounted on a wheel hub 18b. In this particular embodiment, the wheel hub 18b mounted on a stub axle 50b. The callipers 14c and thus the wet disc brake system 10b provides service brakes only with no park (or emergency) braking facility.

Figure 14:
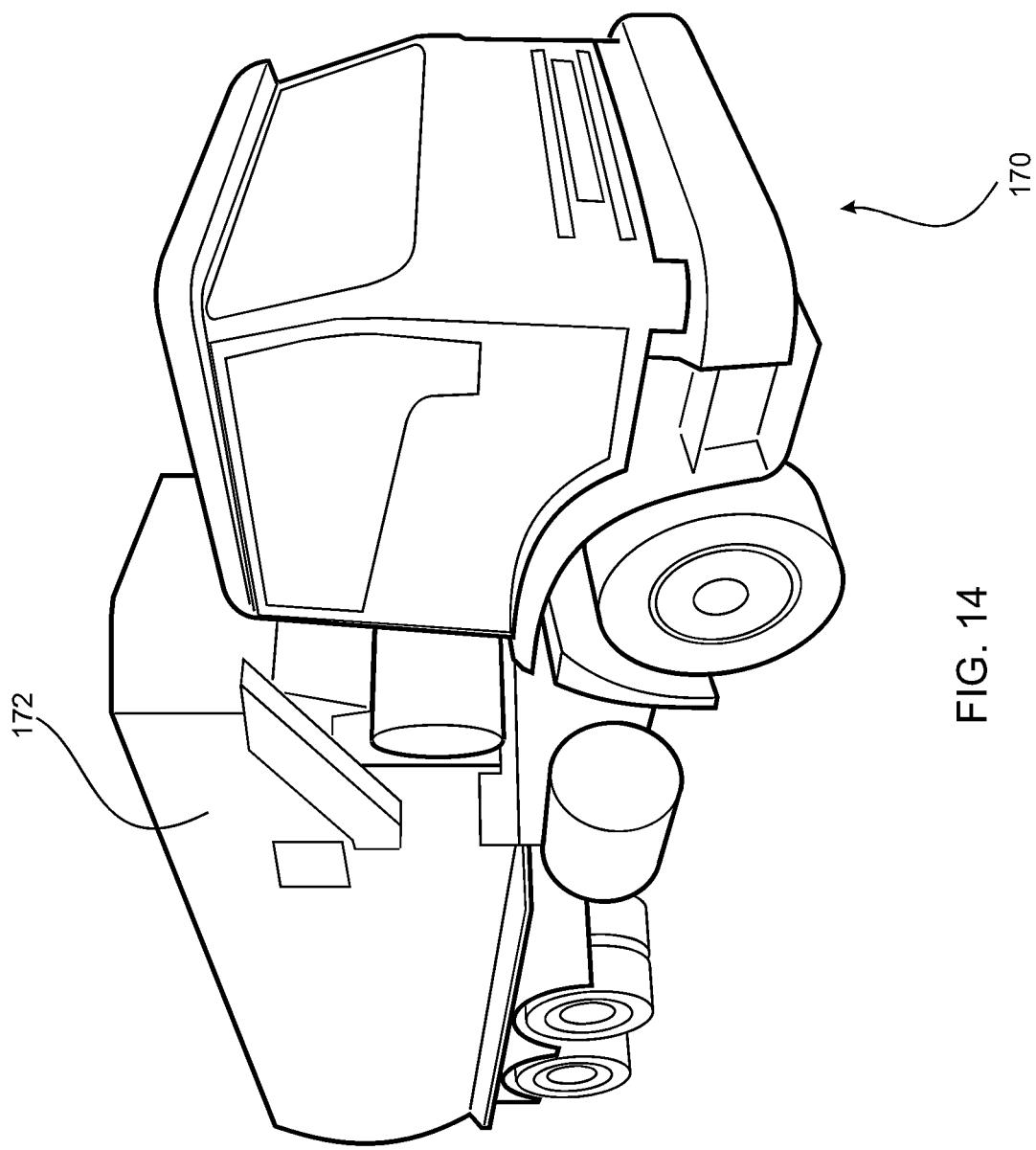
FIG. 14 is a representation of a garbage truck fitted with a wet brake system in accordance with the present invention.
Figure 15:
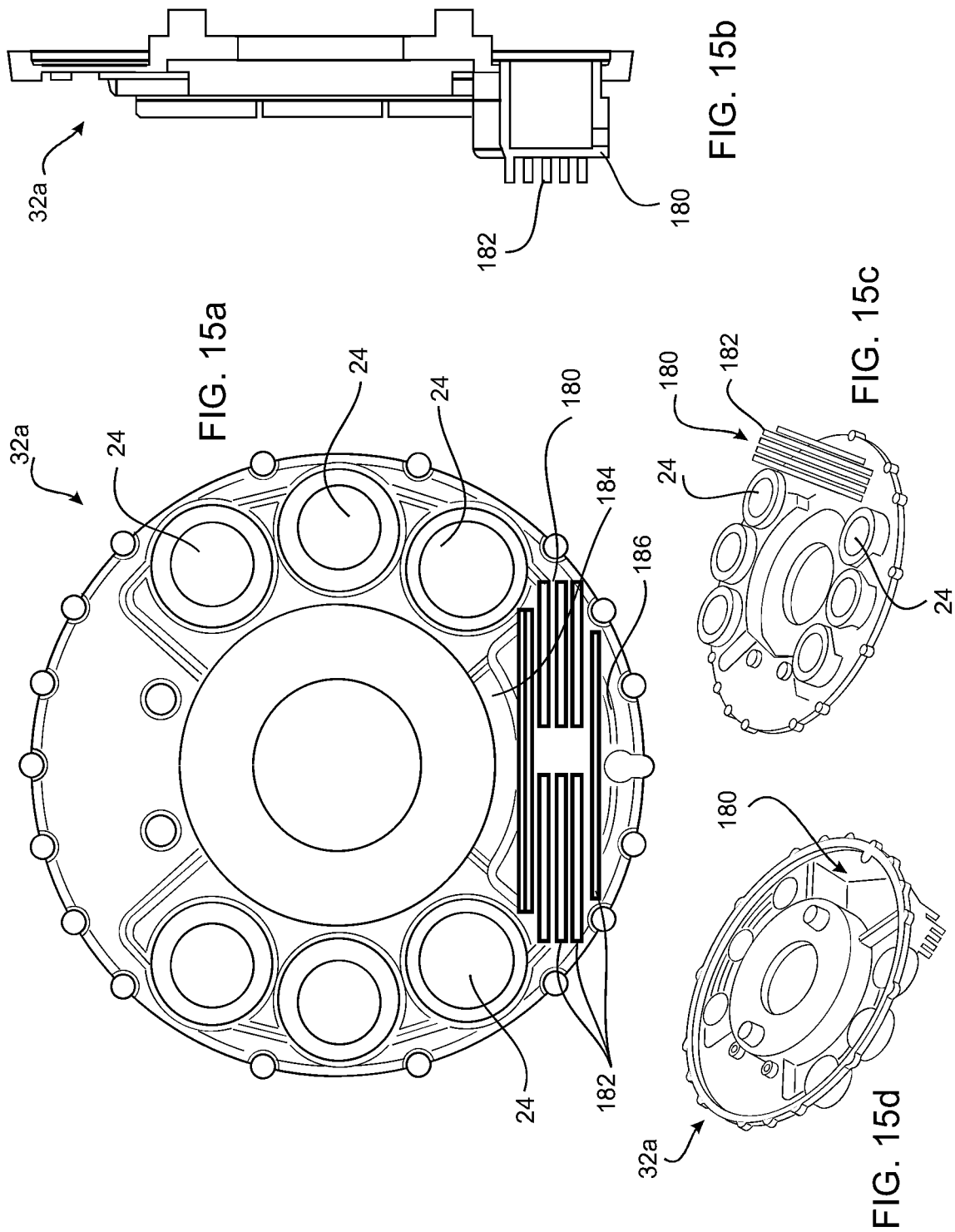

FIG. 14 depicts a garbage truck 170 having a receptacle 172 for holding and transporting waste matter, and mounted on a chassis having a single front axle and a tandem rear axle. The truck 170 in its original form is provided with drum brakes on each of the hubs on each of the axles. The brakes are pneumatically operated. To this end, the truck 170 is provided with an air compressor (not shown) for activating the brakes. Embodiments of the wet disc brake system 10 may be retrofitted to the truck 170 by first removing the original equipment hubs and drum brakes and retrofitting embodiments of the wet disc brake system. For example, a wet disc brake system 10b as shown in FIG. 13 comprising two callipers 14b with a hub 18b may be fitted on the front axles of the truck 170. On each of the rear axles, a wet disc brake system 10 shown in FIGS. 1-4, each provided with a service/park brake calliper 14a and a two piston service brake calliper 14b with a hub 18 can be fitted. In order to provide hydraulic pressure to the service brakes, one or more air over hydraulic actuators (not shown) is provided between the air compressor and the cylinders of callipers that house the service brake pistons 120. Thus the service brakes are hydraulically operated. The parking brake facility provided by the service/park brake calliper 14a is a spring applied air release park brake. The supply of compressed air to the canister 124 operates against the spring within the canister to release the park brake. When either the park brake is actuated, or is there is a loss in air pressure, the spring within the canister 124 is released so that the bias of the spring is applied through the rod 146 to the park piston 144 to apply the park brake.

Due to the configuration of the wet brake system 10, complete brake and hub assemblies for any axle can be preassembled on a work bench and coupled as a single unit to the axle. For example, consider the wet brake assembly 10 illustrated in FIG. 1. This assembly comprises a service and park brake calliper 14a, a two piston service brake calliper 14b. When assembling the brake assembly 10, the callipers 14a and 14b are first assembled with the spring canister 124 and associated wear compensating rod system 145 not being attached to the calliper 14a. The rotor 20 is then placed centrally between the callipers with a portion of the rotor extending between the brake pads 110a and 110b in each of the callipers 14a and 14b. The seals 102 and 100 are seated in the seal carrier/second plate 34. Next, the second plate 34 is passed into the outer casing 30 from the end 38 so as to abut with the inside of the lip 44. The outer casing 30 and second plate 34 are connected together by screws that pass through the lip 44 into the holes 80 in the band 78 of the plate 34. The hub 18 is now inserted into the opening 68 of plate 34. The inner plate 32 is located over the callipers 14a and 14b so that the cylinders of the callipers pass through the openings 24. O-rings 26 seal the cylinder of each of the carriers 14a and 14b to the inner plate 32. Screws which extend through holes 57 into holes 157 connect the inner plate 32 to the callipers 14a and 14b, with the rotor 20 retained within and between the callipers 14a and 14b. The seals 102 and 100 are seated in the plate 34 and the callipers 14a and 14b which are attached to the plate 32 are now lowered into the outer casing 30 with the rotor 20 orientated to slide onto splines on the hub 18. The inner plate 32 is now fastened to the outer casing 30. The entire assembly comprising the callipers 14a and 14b held within the housing 12, and the hub 18 can now be fitted onto an axle assembly. The hub 18 is allowed to rotate on the axle housing 16 via two tapered roller bearings 11, 13 (see FIG. 1) which are seated on the axle housing 16. Axle shaft 50 which extends through the axle housing is attended to the face of the hub 18 by axle studs 15. The wet disc brake assembly is attached to the flange 28 on the axle housing bolts that pass through the holes 54 and threadingly engage with holes 144 in the mounting flange 142 of the callipers 14a and 14b. Thus load applied during a braking operation on the callipers 14a and 14b is transferred via the fasteners to the flange 28 and axle housing 16 rather than being born by the housing assembly 12. Next, hydraulic hoses can be coupled to the cylinders 22 of the callipers 14a and 14b and the canister 124 connected with the calliper 14a.

FIGS. 15a-15d illustrate an inner plate 32a of a further embodiment of a wet brake system 10. The inner plate 32a differs from the inner plate 32 depicted in FIGS. 6a-6d by the provision of a finned sump 180 which protrudes in an axial direction away from the seal carrier or second plate 34. The purpose of the sump 180 is to increase the volume of lubricating oil inside the brake without increasing the level of the oil. Further, the sump 180 lies substantially below the level of the O-ring seals 26 provided in the openings 24 which seat the calliper cylinders 22. Thus the positioning of the sump 180 reduces the likelihood of lubricant leakage about the seals.

The sump 180 is also provided with a plurality of cooling fins 182 to an outside surface of the inner plate 32. The sump 180 and the fins 182 may be dimensioned to protrude beyond the wheel and rims associated with the braking system to increase heat rejection from the braking system 10. A sump fill the hole 184 and sump drainage hole 186 is formed on the outside of the inner plate 32a to allow filling and drainage of the sump 182. The holes 184 and 186 may be closed by conventional plugs.

Figure 16:
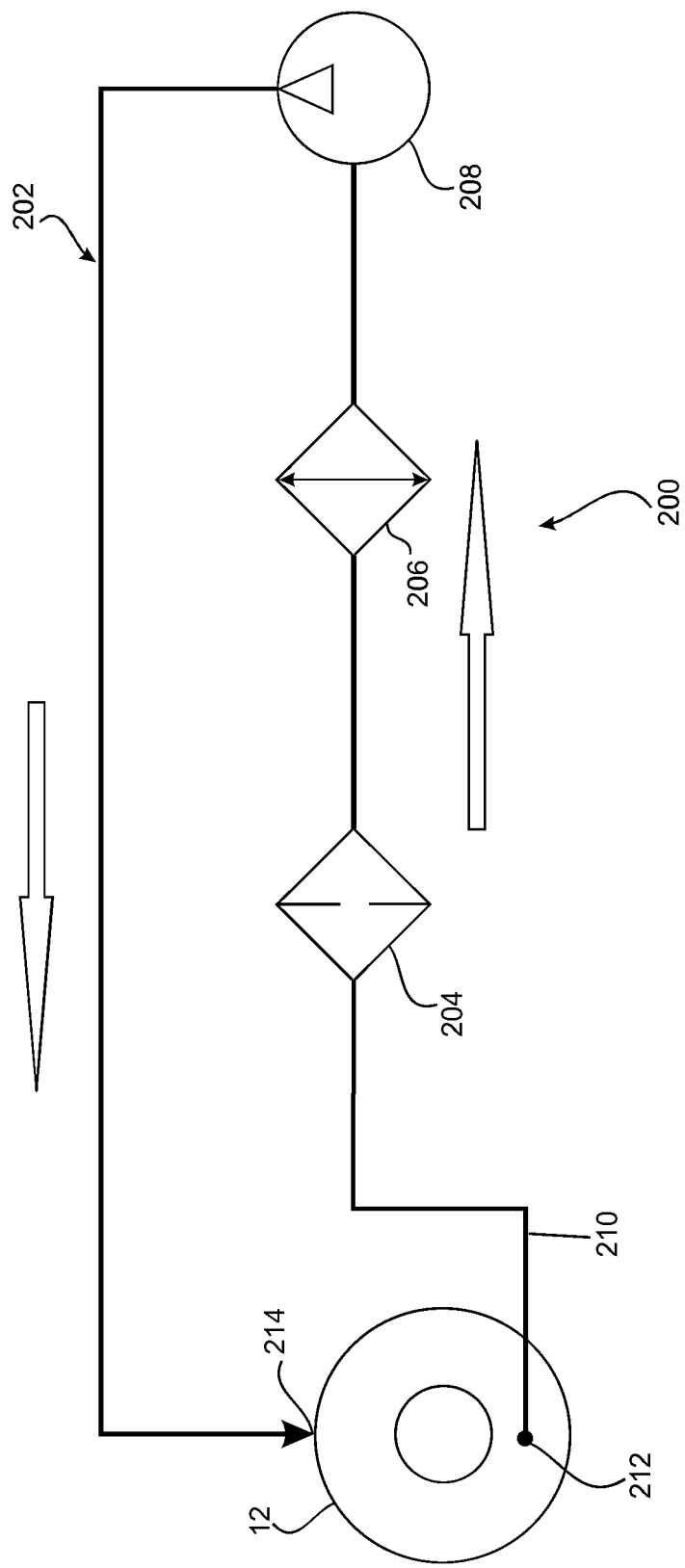
FIG. 16 is a schematic representation of a cooling circuit which may be incorporated in a wet brake system embodiment of the present invention.
Figure 17:
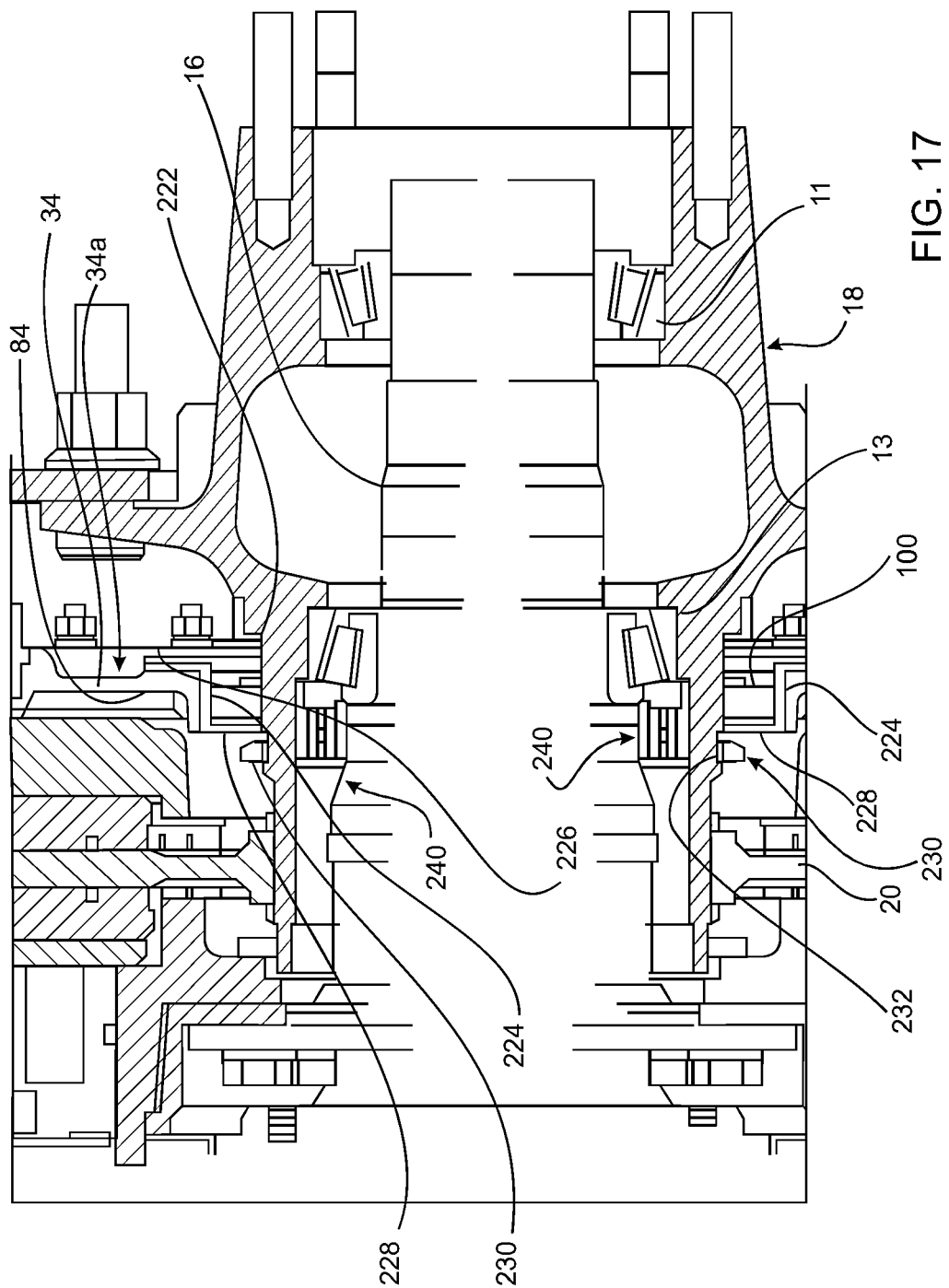
FIG. 17 is a section view of a further embodiment of the disc brake system.

As an addition or an alternative to the fins 182, the brake system 10 may also incorporate a cooling system 200 depicted in FIG. 16 for cooling the lubricant sealed within housing assembly 12 used for lubricating the rotor 20. Cooling system 200 comprises a oil cooling circuit 202 comprising an oil filter 204, oil cooler 206, and pump 208, which are connected in series by a conduit 210 which provides a closed loop with housing 12. Conduit 210 is connected at an outlet 212 in a lower portion of housing 12 and returns via an inlet 214 at a spaced apart location in an upper region of housing 212. Air cooler 206 may be an air cooler similar to a radiator. While one circuit 202 is shown, it is envisaged that each brake system 10 will include a separate fluid circuit although the conduit for each circuit may pass through a common oil cooler 206 in a manner where the fluid for each brake system 10 is kept separate. The order of the filter 204, oil cooler 206 and pump 208 in the circuit 202 is of no significance and may change or be varied to suit the chassis and structure of the vehicle to which the brake system 10 is fitted.

Now that embodiments of the present invention have been described in detail it will be apparent to those skilled in the relevant arts that numerous modifications and variations may be made without departing from the basic inventive concepts. For example, the systems 10 and 10b illustrated and described each comprise two callipers disposed within the housing assembly 12. However the specific combination and number of callipers incorporated may be varied. For example the braking system may comprise only a single calliper 14a, 14b or 14c. When the braking system 10 incorporates two or more callipers, a different combination of callipers to those illustrated may be used. For example the braking system may comprise a service/park brake calliper 14a together with a three piston calliper 14c. An alternate braking system may comprise two two piston callipers 14b; in a further variation for larger or heavier vehicles, three or four callipers may be used in a braking system.

Also, the callipers 14 are described as comprising two shells 104 and 106 which are coupled together. However, in alternate embodiments the callipers may be made as a single or unitary piece. Further, while FIG. 14 illustrates an embodiment of the invention applied to a garbage truck, embodiments of the invention can be applied to other heavy vehicles such as buses and mining trucks.

FIGS. 17 to 19b depict further modifications or variations to the system 10. These variations comprise a modified second plate 34a; the provision of a V-seal 230 about hub 18, and, the inclusion of a wheel bearing seal 240 which forms a seal between an inside of the hub 18 and the axle housing 16. Each of these modifications will now be described in greater detail.

Figure 18:
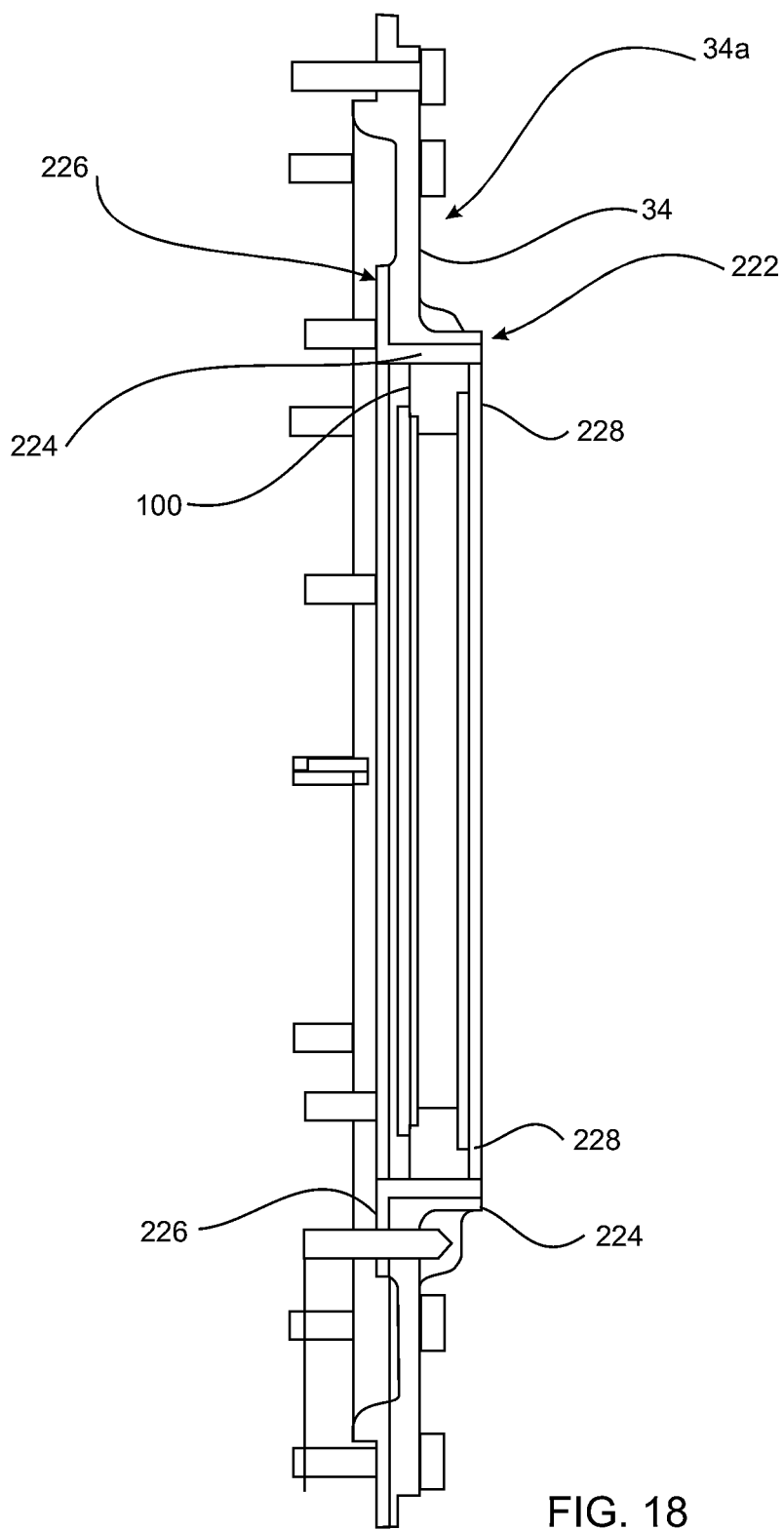
FIG. 18 is a representation of a modified form of a seal carrier.

The second plate 34a which is also shown in FIG. 18, differs from the plate 34 of the first embodiment by the inclusion of an insert seal carrier 222. That is, plate 34a in essence comprises plate 34 with insert seal carrier 222 Insert seal carrier 222 is in the form of a ring having a cylindrical wall 224 which is coaxial with central opening 68 of plate 34 and flanges 226 and 228 at opposite axial ends of cylindrical wall 224. Flange 226 extends in a radial outward direction and overlies the circumferential band 84 while flange 228 extends in a radial inward direction toward an outer circumferential surface of hub 18. The outer diameter of cylindrical wall 224 is smaller than the inner diameter of boss 89 to provide a degree of play between plate 34 and carrier 222. Cassette seal 100 is seated within the inner circumferential surface of insert seal carrier 222. The degree of play between insert seal carrier 222 and plate 34 enables adjustment for any misalignment between cassette seal 100 and the outer surface of hub 18 during assembly. Minimising or eliminating misalignment extends the life of a seal substantially. To accommodate for the play between the insert seal carrier 222 and plate 34, holes in the flange 226 to enable coupling of the insert 222 to the plate 34 are slightly oversize for the fastener used. When the system 10 is being assembled and installed, the fasteners used to attach insert 222 to plate 34 are initially loosened to enable adjustment for any misalignment. Once the seal cassette 100 and hub 18 have been properly aligned, the fastener may then be tightened.

V-seal 230 is seated in a shallow circumferential groove 232 machined about the outer circumferential surface of hub 18 and located so that the V seal 230 bears against flange 228 of the insert seal carrier 222. V-seal 230 rotates with hub 18 and acts as a "flinger" for the lubricant within system 10 as well as preventing the lubricant from reaching the main housing seal.

Figure 19B:
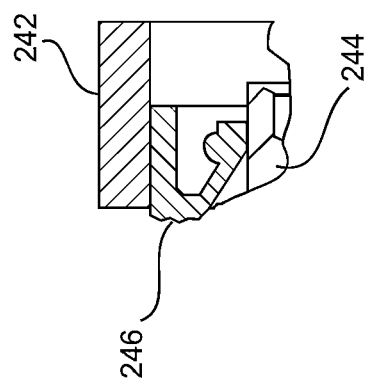
Figure 19A:
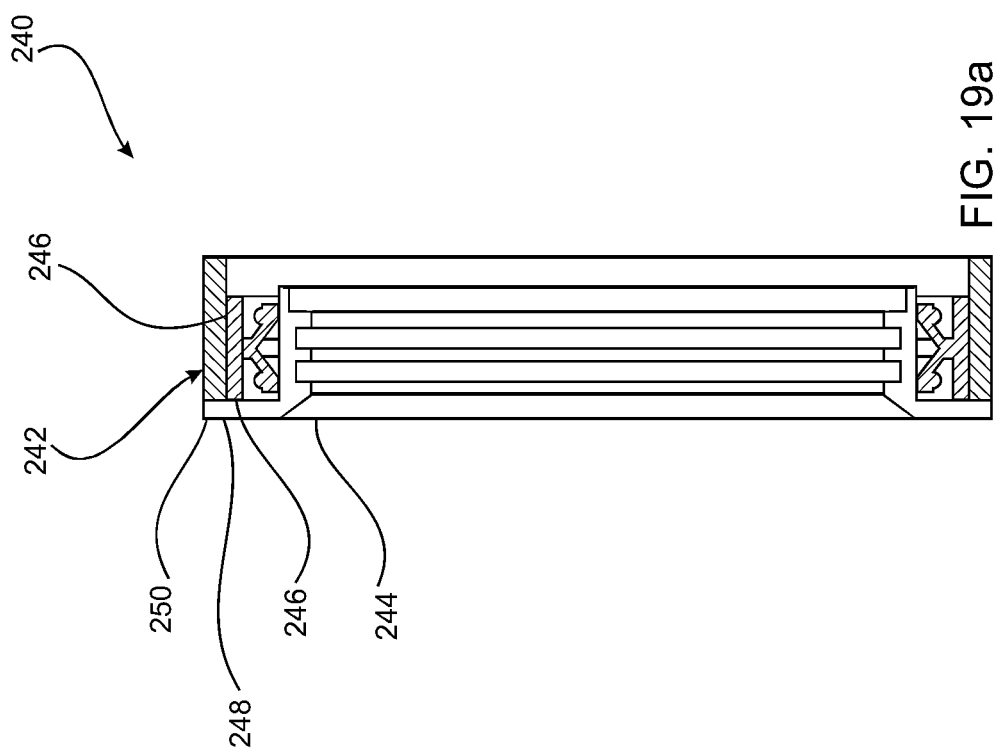

The double lip wheel bearing seal 240 creates a fluid seal to prevent communication between the lubricant used in wet brake system 10, and diff oil used for lubricating the hub wheel bearings 11 and 13. With particular reference to FIGS. 19a and 19b, the seal 240 comprises an outer hub seal 242 which is pressed into a seat formed on an inner circumferential surface of hub 18, and an inner hub seal 244 that is pressed onto a seat formed on the axle housing 16. Two lip seals 246 are installed back to back between the outer hub seal 242 and inner hub seal 244. Inner hub seal 244 is provided with a radially extending flange 248 which extends across an axial end of the outer hub seal 242. A wear ring 250 which may be made for example from PTFE is located between the flange 248 and adjacent axial end of outer hub seal 242.

While various embodiments are described as and in the context of a wet brake system, the very same embodiments may of course be used as dry brake systems by not supplying lubricant to the inside of the housing. In such a dry brake system the non structural nature of the housing is unchanged as reactive forces generated by operation of the callipers are transferred through fasteners which couple the callipers to the flange 28 or other structural component. Indeed the form of the housing may be simplified for a dry brake embodiment as there is no need to form a sealed, or at least liquid tight, cavity to retain lubricant.

In yet a further variation of brake system 10, irrespective of whether the brake system is used as a wet brake system or a dry brake system, the first plate 32 may be formed integrally with the outer casing 30. In yet a further variation, the openings 24 formed in housing assembly 12 and in particular plate 32, may be formed with axially extending circumferential walls about which seals such as boot seals may be attached to prevent the leakage of lubricant from within the system 10 and/or preventing ingress of foreign matter into system 10. Such boots, if used will also be provided with sealed openings to allow hydraulic hoses to pass therethrough to supply the callipers with hydraulic fluid for operating the calliper pistons 120. In the event that the boots or other external seals are used, it may be possible to dispense with the O-rings 26.

All such modifications and variations together with others that would be obvious to persons of ordinary skill in the art are deemed to be within the scope of the present invention, the nature of which is to be determined from the above description and the appended claims.

The invention claimed is:

1. A wet disc brake system comprising:
a housing configured to form a sealed cavity about a body rotating relative to the housing;
one or more brake callipers disposed in the housing, the brake callipers provided with one or more cylinders;
the housing having an outer casing which extends circumferentially about the one or more callipers, and a first plate disposed on one side of the outer casing, the first plate being provided with:
a) an opening for each of the cylinders, wherein each cylinder is seated in a respective opening; and
b) a plurality of calliper fastening holes capable of being aligned with holes in a structural component of an axle housing,
wherein fasteners are able to engage the callipers, pass through the calliper holes in the first plate and into the holes of the structural component wherein load on the one or more callipers during braking is transferred to and borne by the axle housing via the fasteners.

2. The wet disc brake system according to claim 1 comprising a respective seal located between each cylinder and respective openings in the first plate to form a corresponding seal between that cylinder and the respective opening.

3. The wet disc brake system according to claim 1 wherein the outer casing has opposite first and second axial ends and a lip projection radially inward extending about the second axial end.

4. The wet disc brake system according to claim 3 wherein the housing comprises a second plate demountably attached to the lip of the outer casing, the second plate provided with an opening for receiving a hub which extends into the housing.

5. The wet disc brake system according to claim 4 wherein the second plate has an outer diameter greater than an inner diameter of the lip and wherein the second plate is disposed on a side of the lip inside of the outer casing.

6. The wet disc brake system according to claim 5 wherein the second plate comprises an axially extending boss which defines the opening in the second plate for receiving the hub, the boss having a circumferential seat and a seal on the seat which forms a liquid seal about the hub.

7. The wet disc brake system according to claim 1 wherein each calliper comprises first and second shells demountably coupled together, the first shell provided with the plurality of cylinders, the first and second shells being relatively shaped to form a cavity therebetween and through which the body rotates, the cavity opening onto an outer surface of the calliper to form a gap between the shells.

8. The wet disc brake system according to claim 7 wherein each calliper comprises at least one strap extending across the gap and coupled to each of the first and second shells.

9. The wet disc brake system according to claim 8 wherein opposite ends of each strap seat in respective recesses formed in the first and second shells.

10. A heavy vehicle comprising:
a brake system according to claim 1;
a receptacle configured to hold waste material;
an air compressor;
the brake system driven by compressed air from the air compressor to brake motion of the heavy vehicle the brake system comprising a service brake and a park brake, the service brake being a wet air over hydraulic actuated disc brake, and the park brake being a spring applied and air released brake.

11. The heavy vehicle according to claim 10 wherein at least one brake calliper is configured to provide both the service brake and park brake.

* * * * *